(12) United States Patent
Shimamura

(10) Patent No.: US 10,155,317 B2
(45) Date of Patent: *Dec. 18, 2018

(54) INFORMATION PROCESSING SYSTEM, INFORMATION PROCESSING DEVICE, WORKPIECE POSITION IDENTIFYING METHOD, AND WORKPIECE POSITION IDENTIFYING PROGRAM

(71) Applicant: OMRON Corporation, Kyoto (JP)

(72) Inventor: Junji Shimamura, Takatsuki (JP)

(73) Assignee: OMRON Corporation, Kyoto (JP)

( * ) Notice: Subject to any disclaimer, the term of this patent is extended or adjusted under 35 U.S.C. 154(b) by 11 days.

This patent is subject to a terminal disclaimer.

(21) Appl. No.: 15/438,666

(22) Filed: Feb. 21, 2017

(65) Prior Publication Data

US 2018/0043541 A1 Feb. 15, 2018

(30) Foreign Application Priority Data

Aug. 9, 2016 (JP) .................................. 2016-156535

(51) Int. Cl.
*B25J 9/16* (2006.01)
*G06T 7/70* (2017.01)
(Continued)

(52) U.S. Cl.
CPC ........... *B25J 9/1697* (2013.01); *B25J 9/1612* (2013.01); *G01B 11/002* (2013.01); (Continued)

(58) Field of Classification Search
CPC ......... B25J 9/1697; B25J 9/1612; G06T 7/70; G06T 7/20; G06T 7/0004; H04N 5/2353
See application file for complete search history.

(56) References Cited

U.S. PATENT DOCUMENTS

2005/0216216 A1  9/2005  Shimada et al.
2012/0236140 A1*  9/2012  Hazeyama ............. B25J 9/1697
                                                              348/94
2013/0329954 A1  12/2013  Ikeda et al.

FOREIGN PATENT DOCUMENTS

EP  2500147  9/2012
EP  2667145  11/2013
(Continued)

OTHER PUBLICATIONS

"Search Report of Europe Counterpart Application", dated Jul. 7, 2017, p. 1-p. 9.

*Primary Examiner* — Ruiping Li
(74) *Attorney, Agent, or Firm* — JCIPRNET

(57) ABSTRACT

An information processing system for identifying a position of a workpiece conveyed on a conveyor is provided. A counter measures a movement amount of a conveyor a plurality of times at intervals shorter than a cycle of communication with a controller, and transmits measured movement amounts and respective measurement timings to the controller. The controller receives a position of a workpiece measured from an image obtained at a set imaging timing, identifies measurement timings relatively close to the imaging timing from among measurement timings, identifies a reference movement amount associated with the measurement timing, identifies a reference position of the workpiece at the imaging timing based on the position of the workpiece within the image, and adds a difference between the current movement amount of the conveyor and the reference movement amount to the reference position to calculate a current position of the workpiece.

14 Claims, 13 Drawing Sheets

(51) Int. Cl.
  *G06T 7/00* (2017.01)
  *G06T 7/20* (2017.01)
  *H04N 5/04* (2006.01)
  *G01B 21/04* (2006.01)
  *G01B 11/00* (2006.01)
  *H04N 5/235* (2006.01)

(52) U.S. Cl.
  CPC .......... *G01B 21/045* (2013.01); *G06T 7/0004* (2013.01); *G06T 7/20* (2013.01); *G06T 7/70* (2017.01); *H04N 5/04* (2013.01); *G05B 2219/39543* (2013.01); *G06T 2207/30164* (2013.01); *H04N 5/2353* (2013.01)

(56) References Cited

FOREIGN PATENT DOCUMENTS

| | | |
|---|---|---|
| EP | 2667350 | 11/2013 |
| EP | 2793183 | 10/2014 |
| JP | 2005-293567 | 10/2005 |
| JP | 2009-157913 | 7/2009 |
| JP | 2012-166308 | 9/2012 |
| JP | 2015-174171 | 10/2015 |

\* cited by examiner

| measurement timing (time) | count value |
|---|---|
| $t_1$ | $C_1$ |
| $t_2$ | $C_2$ |
| ⋮ | ⋮ |
| $t_N$ | $C_N$ |
FIG. 5
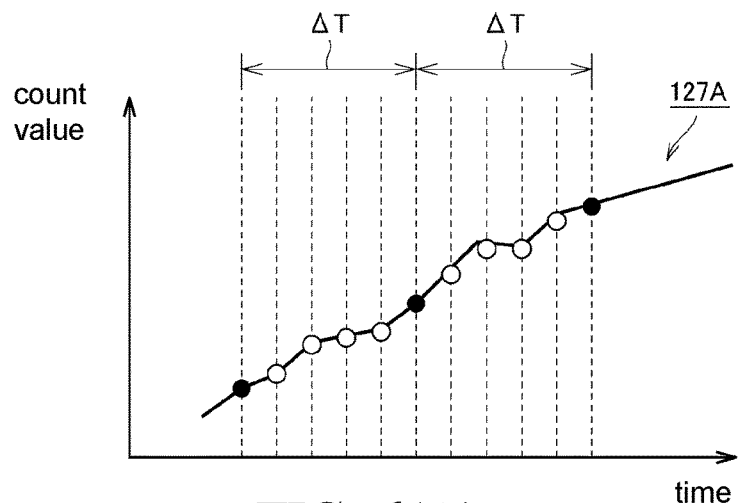
FIG. 6(A)
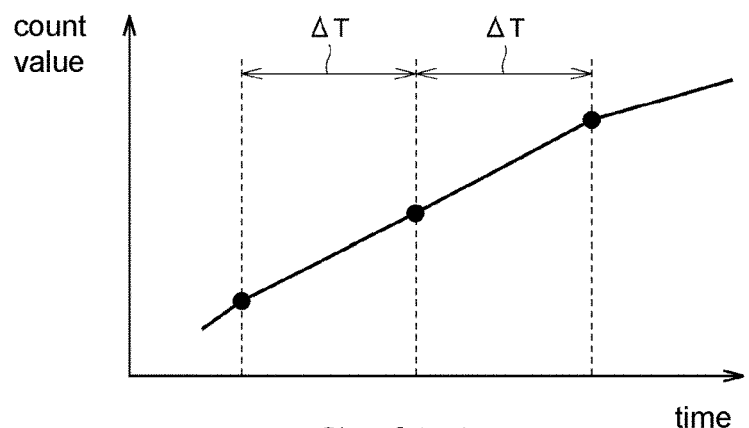
FIG. 6(B)

| workpiece number | workpiece coordinates (camera coordinate system) |
|---|---|
| $n_1$ | $(x_1, y_1, \theta_1)$ |
| $n_2$ | $(x_2, y_2, \theta_2)$ |
| ⋮ | ⋮ |

INFORMATION PROCESSING SYSTEM, INFORMATION PROCESSING DEVICE, WORKPIECE POSITION IDENTIFYING METHOD, AND WORKPIECE POSITION IDENTIFYING PROGRAM

CROSS-REFERENCE TO RELATED APPLICATION

This application claims the priority benefit of Japanese application serial no. 2016-156535, filed on Aug. 9, 2016. The entirety of the above-mentioned patent application is hereby incorporated by reference herein and made a part of this specification.

BACKGROUND OF THE INVENTION

1. Field of the Invention

The present disclosure relates to a technology for identifying a position of a workpiece that is conveyed on a conveyor.

2. Description of Related Art

In the field of factory automation (FA), industrial robots capable of picking up a workpiece that is conveyed on a conveyor are prevalent. For example, the robot is used to select a workpiece that is conveyed on a conveyor according to a type thereof.

Regarding industrial robots, Japanese Unexamined Patent Application Publication No. 2015-174171 (Patent Document 1) discloses a robot control device "capable of correctly gripping a workpiece even when a conveyor has deflection, bulginess, or inclination." Japanese Unexamined Patent Application Publication No. 2012-166308 (Patent Document 2) discloses an image processing device "capable of accurately performing a tracking process even when there is a time lag from generation of an imaging instruction for an imaging device to actual performance of imaging."

When a workpiece on a conveyor is selected, it is important to accurately detect a position of the workpiece. For this purpose, it is necessary to accurately recognize a measurement timing of a measurement device. For example, Japanese Unexamined Patent Application Publication No. 2005-293567 (Patent Document 3) discloses a measurement device "capable of outputting a measurement value of a measurement target to an external control device together with information on a time at which the measurement value has been obtained." As a method of synchronizing time of individual devices, Japanese Unexamined Patent Application Publication No. 2009-157913 (Patent Document 4) discloses an industrial controller that "performs time synchronization without influencing control among units each including a clock having a clock function in the order of ns."

PRIOR ART DOCUMENT

Patent Document

[Patent Document 1] Japanese Unexamined Patent Application Publication No. 2015-174171
[Patent Document 2] Japanese Unexamined Patent Application Publication No. 2012-166308
[Patent Document 3] Japanese Unexamined Patent Application Publication No. 2005-293567
[Patent Document 4] Japanese Unexamined Patent Application Publication No. 2009-157913

SUMMARY OF THE INVENTION

Problem to be Solved by the Invention

An industrial robot is controlled by, for example, a controller such as a programmable logic controller (PLC). The controller tracks a workpiece on a conveyor and controls the industrial robot on the basis of a result of the tracking. In order to track the workpiece, it is important to accurately identify a position of the workpiece on the conveyor.

An example of a workpiece position identifying method will be described. First, a measurement instruction is transmitted from a controller to an image sensor. The image sensor outputs an imaging instruction to a connected camera. The camera starts exposure and outputs an image including the workpiece to the image sensor at a time point at which the exposure is completed. The image sensor executes image processing such as pattern matching on the obtained image and transmits a position of the workpiece within the image to the controller. The controller calculates a position (hereinafter also referred to as a "reference position") of the workpiece on the conveyor at the time of imaging on the basis of a position of the workpiece that is a relative position from an origin within the image and a counter value to be described below. Further, an amount of movement of the workpiece from the reference position is calculated on the basis of the counter value, and a current position of the workpiece with respect to the robot is designated.

A time at which a measurement result is transmitted to the controller after the controller outputs a measurement instruction to the image sensor is delayed by tens to hundreds of milliseconds, and a delay time is not constant. Therefore, there is no means for accurately recognizing an imaging timing.

A movement amount of the conveyor is measured by, for example, a movement amount measurement device such as a counter. The counter measures the movement amount of the conveyor on the basis of a pulse wave generated from an encoder. The encoder outputs the pulse wave to the counter according to the movement amount of the conveyor. The counter transmits a count value of the pulse wave to the controller at a certain communication cycle. An interval of communication between the counter and the controller is constant, and a sampling period of the count value depends on the communication cycle between the counter and the controller. Therefore, a change in the count value between the communication cycles cannot be measured.

Further, there is no means for the controller to accurately recognize a time at which a camera of an image sensor has performed imaging, as described above. Even when an imaging time is able to be estimated, a counter value cannot be measured when the workpiece is imaged between a previous transmission timing and the next transmission timing. Since there is no means for recognizing the counter value at the imaging time, the above-described reference position cannot be calculated with high accuracy, and accuracy of a subsequent tracking process is greatly degraded. Patent Documents 1 to 4 do not disclose a solution to such problems. Therefore, a technology capable of more accurately identifying a position of a workpiece that is conveyed on a conveyor is desired.

Means for Solving the Problem

According to a certain aspect, an information processing system for identifying a current position of a workpiece that is conveyed on a conveyor includes: an information processing device for receiving a setting of an imaging timing; an image sensor for imaging the workpiece that is conveyed on the conveyor and measuring a position of the workpiece within an obtained image on the basis of arrival of the imaging timing received from the information processing device, and transmitting the position of the workpiece within the image to the information processing device; and a movement amount measurement device capable of communicating with the information processing device. The movement amount measurement device measures a movement amount of the conveyor a plurality of times at intervals shorter than a cycle of communication with the information processing device, and transmits the plurality of measured movement amounts and the measurement timings of the plurality of respective movement amounts to the information processing device as a result of the measurement on the basis of arrival of a timing of transmission to the information processing device. The information processing device includes a movement amount identifying unit for identifying one or more measurement timings relatively close to the imaging timing from a plurality of measurement timings defined in the measurement result, and identifying a movement amount associated with the measurement timing as a reference movement amount; a position identifying unit for identifying a position of the workpiece at the imaging timing as a reference position on the basis of the position of the workpiece within the image received from the image sensor; and a calculation unit for calculating the movement amount of the workpiece according to an elapsed time from the imaging timing on the basis of a current movement amount of the conveyor received from the movement amount measurement device and the reference movement amount, and adding the movement amount to the reference position to calculate the current position of the workpiece.

Preferably, the calculation unit adds a difference between the current movement amount of the conveyor received from the movement amount measurement device and the reference movement amount to the reference position to calculate the current position of the workpiece.

Preferably, the information processing device further includes an output unit for outputting an operation instruction to a robot that picks up the workpiece using the current position of the workpiece calculated by the calculation unit.

Preferably, the movement amount identifying unit identifies the measurement timing closest to the imaging timing from among the plurality of measurement timings defined in the measurement result received from the movement amount measurement device, and identifies the movement amount associated with the measurement timing as the reference movement amount.

Preferably, the movement amount identifying unit identifies a first measurement timing closest to the imaging timing and a second measurement timing second closest to the imaging timing from among a plurality of measurement timings defined in the measurement result received from the movement amount measurement device, and identifies the reference movement amount to be between a movement amount associated with the first measurement timing and a movement amount associated with the second measurement timing.

Preferably, the movement amount identifying unit identifies the reference movement amount to closer to the movement amount associated with the first measurement timing than to the movement amount associated with the second measurement timing.

Preferably, the movement amount measurement device includes an encoder for generating a pulse signal according to the movement amount of the conveyor; and a counter for counting the number of pulses included in the pulse signal as the movement amount.

Preferably, the movement amount measurement device includes a motor for driving the conveyor; and an encoder for measuring a driving amount of the motor as the movement amount.

Preferably, the information processing device further includes a reception unit for receiving a setting of a measurement interval of the movement amount in the movement amount measurement device.

Preferably, the image sensor includes a first timer for measuring arrival of the imaging timing received from the information processing device. The movement amount measurement device includes a second timer for measuring a measurement timing of the movement amount. The first timer and the second timer are synchronized with each other.

Preferably, the information processing device receives a setting of at least one of an exposure start time and an exposure end time of the image sensor as the imaging timing.

Preferably, the information processing device receives a setting of an imaging interval of the workpiece in the image sensor as the imaging timing.

Preferably, the image sensor performs a sequential imaging process at the set imaging intervals.

According to another aspect, an information processing device for identifying a current position of a workpiece that is conveyed on a conveyor includes a communication unit for communicating with a movement amount measurement device that sequentially measures a movement amount of the workpiece that is conveyed on the conveyor. The communication unit receives the movement amount measured a plurality of times at intervals shorter than a cycle of the communication with the movement amount measurement device, and measurement timings of the plurality of respective movement amounts as a result of the measurement from the movement amount measurement device. The information processing device further includes a reception unit for receiving a setting of imaging timing for an image sensor that images the workpiece that is conveyed on the conveyor; an acquisition unit for acquiring, from the image sensor, a position of the workpiece measured from an image obtained by imaging the workpiece that is conveyed on the conveyor at the imaging timing; a movement amount identifying unit for identifying one or more measurement timings relatively close to the imaging timing from among a plurality of measurement timings defined in the measurement result, and identifying a movement amount associated with the measurement timing as a reference movement amount; a position identifying unit for identifying a position of the workpiece at the imaging timing as a reference position on the basis of the position of the workpiece within the image; and a calculation unit for calculating the movement amount of the workpiece according to an elapsed time from the imaging timing on the basis of a current movement amount of the conveyor received from the movement amount measurement device and the reference movement amount, and adding the movement amount to the reference position to calculate the current position of the workpiece.

According to another aspect, a position identifying method of identifying a current position of a workpiece that is conveyed on a conveyor includes a step of communicating with a movement amount measurement device that sequentially measures a movement amount of the workpiece that is conveyed on the conveyor. The communicating step includes a step of receiving the movement amount measured a plurality of times at intervals shorter than a cycle of the communication with the movement amount measurement device, and measurement timings of the plurality of respective movement amounts as a result of the measurement from the movement amount measurement device. The position identifying method further includes a step of receiving a setting of imaging timing for an image sensor that images the workpiece that is conveyed on the conveyor; a step of acquiring, from the image sensor, a position of the workpiece measured from an image obtained by imaging the workpiece that is conveyed on the conveyor at the imaging timing; a step of identifying one or more measurement timings relatively close to the imaging timing from among a plurality of measurement timings defined in the measurement result, and identifying a movement amount associated with the measurement timing as a reference movement amount; a step of identifying a position of the workpiece at the imaging timing as a reference position on the basis of the position of the workpiece within the image; and a step of calculating the movement amount of the workpiece according to an elapsed time from the imaging timing on the basis of a current movement amount of the conveyor received from the movement amount measurement device and the reference movement amount, and adding the movement amount to the reference position to calculate the current position of the workpiece.

According to another aspect, a position identifying program for identifying a current position of a workpiece that is conveyed on a conveyor causes an information processing device to execute a step of communicating with a movement amount measurement device that sequentially measures a movement amount of the workpiece that is conveyed on the conveyor. The communicating step includes a step of receiving the movement amount measured a plurality of times at intervals shorter than a cycle of the communication with the movement amount measurement device, and measurement timings of the plurality of respective movement amounts as a result of the measurement from the movement amount measurement device. The position identifying program further causes the information processing device to execute a step of receiving a setting of imaging timing for an image sensor that images the workpiece that is conveyed on the conveyor; a step of acquiring, from the image sensor, a position of the workpiece measured from an image obtained by imaging the workpiece that is conveyed on the conveyor at the imaging timing; a step of identifying one or more measurement timings relatively close to the imaging timing from among a plurality of measurement timings defined in the measurement result, and identifying a movement amount associated with the measurement timing as a reference movement amount; a step of identifying a position of the workpiece at the imaging timing as a reference position on the basis of the position of the workpiece within the image; and a step of calculating the movement amount of the workpiece according to an elapsed time from the imaging timing on the basis of a current movement amount of the conveyor received from the movement amount measurement device and the reference movement amount, and adding the movement amount to the reference position to calculate the current position of the workpiece.

Advantage of the Invention

In a certain aspect, it is possible to more accurately identify the position of the workpiece that is conveyed on the conveyor.

The above and other objects, characteristics, aspects, and advantages of the present disclosure will become apparent from the following detailed description of the present invention that is understood in conjunction with the accompanying drawings.

BRIEF DESCRIPTION OF THE DRAWINGS

FIG. 5 is a diagram illustrating an example of a data structure of a counter measurement result.

FIGS. 6(A) and 6(B) are graphs illustrating a relationship between a count value and a measurement timing.

FIG. 7 is a diagram illustrating an example of a data structure of a workpiece measurement result.

DESCRIPTION OF THE EMBODIMENTS

[Mode for Carrying Out the Invention]

Figure 1:
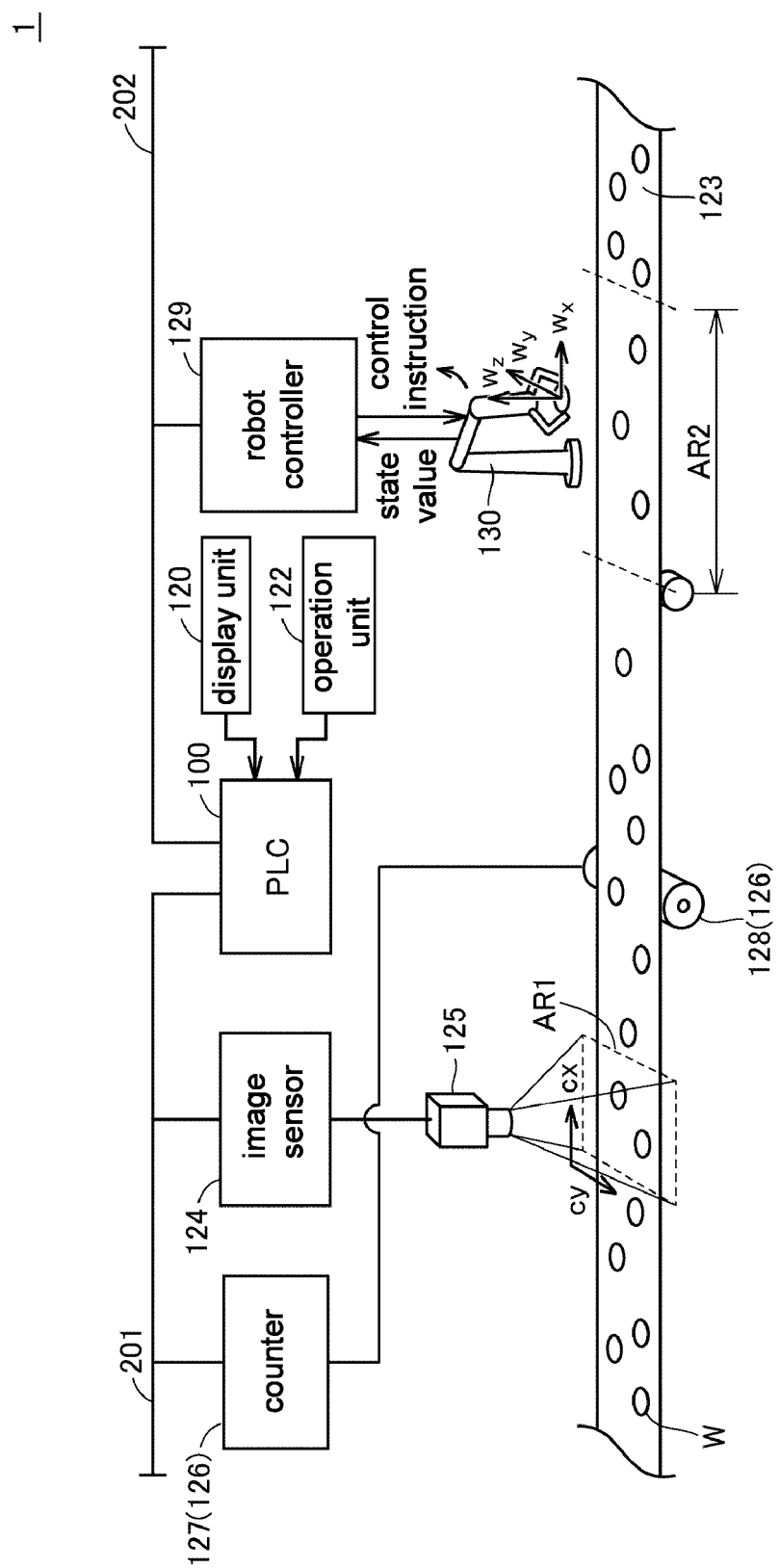
FIG. 1 is a schematic diagram illustrating a basic configuration of an information processing system according to an embodiment.

Hereinafter, embodiments according to the present invention will be described with reference to the drawings. In the following description, the same parts and components are denoted with the same reference numerals. Names and functions thereof are also the same. Therefore, detailed description thereof will not be repeated.

<A. Information Processing System 1>

A basic configuration of an information processing system 1 according to this embodiment will be described with reference to FIGS. 1 and 2. FIG. 1 is a schematic diagram illustrating the basic configuration of the information processing system 1 according to this embodiment.

As illustrated in FIG. 1, the information processing system 1 includes a controller 100 serving as an information processing device, an image sensor 124, an imaging unit 125 serving as a camera, a movement amount measurement device 126, a robot controller 129, and a robot 130.

The controller 100 is, for example, a PLC, and controls the entire information processing system 1. A display unit 120 and an operation unit 122 can be connected to the controller 100. The display unit 120 includes a liquid crystal panel or the like capable of displaying images. The operation unit 122 typically includes a touch panel, a keyboard, a mouse, and the like.

The movement amount measurement device 126 includes, for example, a counter 127 and an encoder 128. The counter 127 and the encoder 128 are electrically connected. The encoder 128 is electrically connected to a motor for driving a conveyor 123.

The controller 100, the image sensor 124, and the counter 127 are connected to a field network 201 in a daisy chain. For example, EtherCAT (registered trademark) is adopted as the field network 201. Further, the controller 100 is communicatively connected to the robot controller 129 via the field network 202. For example, EtherNET (registered trademark) is adopted as the field network 202.

In the information processing system 1, predetermined work is performed on a workpiece W that is conveyed on the conveyor 123. The workpiece W is a product or a half-finished product. For example, the workpiece W may be a grocery or may be an electronic component such as a connector.

The counter 127 measures a movement amount of the conveyor on the basis of a pulse wave that is generated from the encoder 128. More specifically, the encoder 128 generates a pulse signal according to the movement amount of the conveyor 123. The counter 127 receives the pulse signal from the encoder 128 and counts the number of pulses included in the pulse signal, thereby measuring the movement amount of the conveyor 123. The counter 127 transmits a count value of the pulse wave to the controller 100 via the image sensor 124 at a certain communication cycle.

Figure 2:
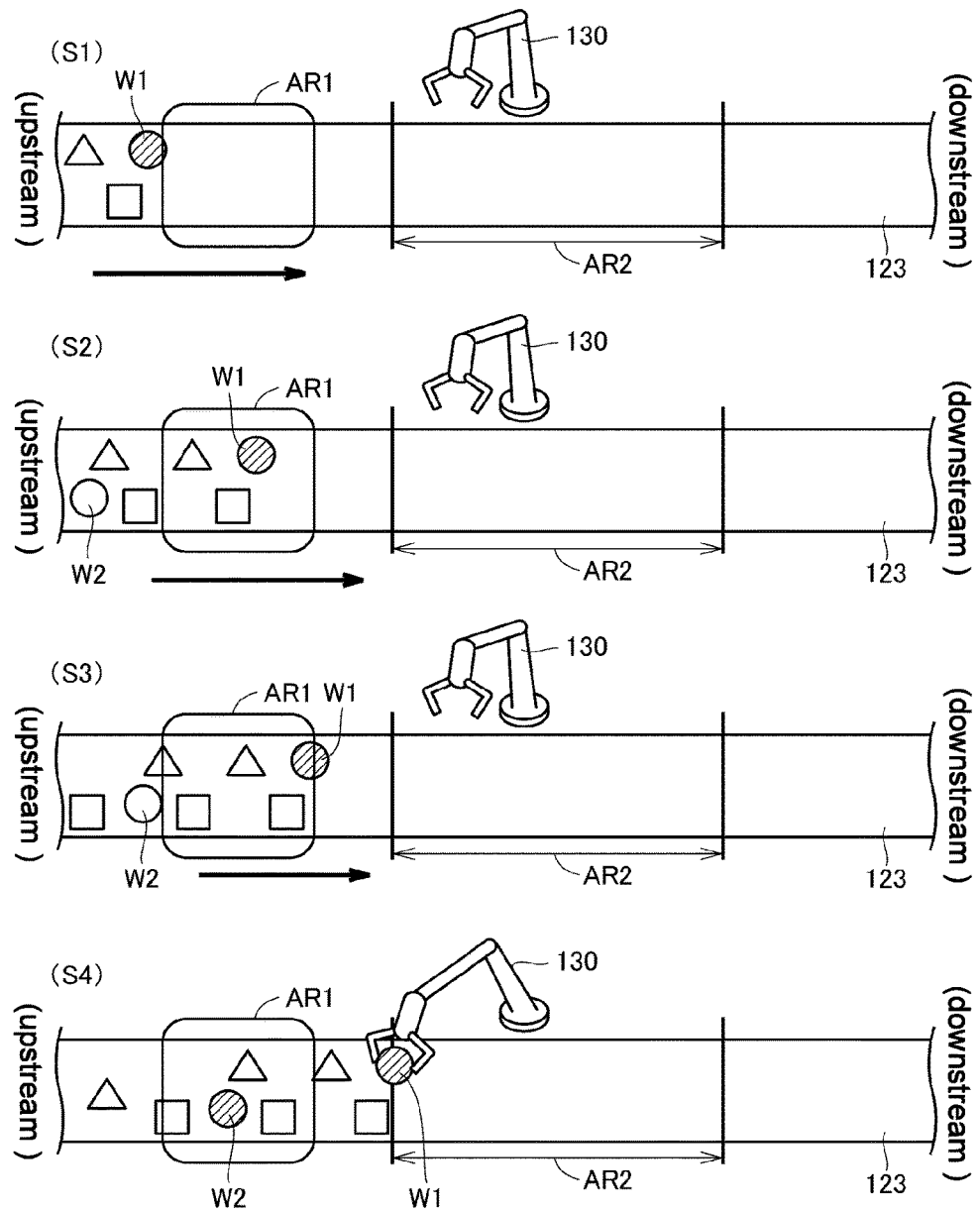
FIG. 2 is a diagram illustrating a work process of selecting a workpiece that is conveyed on a conveyor.

FIG. 2 is a diagram illustrating a work process of selecting workpieces conveyed on the conveyor 123. In the example of FIG. 2, it is assumed that workpieces W1 and W2 having round shapes are selection aspects.

In step S1, it is assumed that the workpiece W1 that is a selection target reaches an imaging area AR1 of the imaging unit 125.

In step S2, the controller 100 transmits an imaging instruction to the image sensor 124, and causes the imaging unit 125 to execute an imaging process. The imaging instruction is transmitted to the image sensor 124, for example, regularly. For example, the controller 100 transmits the imaging instruction to the image sensor 124 at a timing at which a difference value between a count value of the counter 127 at the time of output of a previous imaging instruction and a current count value exceeds a predetermined value. Accordingly, an imaging process of the workpiece W is regularly executed.

The image sensor 124 measures the workpiece W1 from the inside of an input image obtained from the imaging unit 125. For example, the image sensor 124 measures the workpiece W1 through image processing such as pattern matching. More specifically, a model image indicating a workpiece that is a selection target is registered in the image sensor 124 in advance, and the image sensor 124 searches for an image area similar to the model image in the input image obtained from the imaging unit 125. When the image area similar to the model image is measured, the image sensor 124 stores a position of the image area. The position of the workpiece W1 measured by the image sensor 124 is represented as a coordinate value (cx, cy) [pixels] of a camera coordinate system. The image sensor 124 outputs the workpiece position in the image to the controller 100.

The controller 100 converts the coordinate value of the camera coordinate system into a coordinate value of a world coordinate system on the basis of the count value at the imaging timing and a predetermined coordinate transformation expression. A method of obtaining the count value at the imaging timing will be described below in detail. The world coordinate system is a coordinate system for controlling the robot 130, and a position of the workpiece W in the world coordinate system is represented by a coordinate value (wx, wy, wz) [mm]. The coordinate value indicates the position (that is, a reference position) of the workpiece at the imaging timing.

The controller 100 tracks the workpiece W1 on the basis of the position of the workpiece W1 represented in the world coordinate system. More specifically, if the controller 100 receives the current count value from the counter 127, the controller 100 calculates a movement amount of the workpiece W1 from the imaging timing on the basis of a difference between the current new count value and the count value at the time of imaging the workpiece W1. The controller 100 adds the movement amount to the reference position of the workpiece at the imaging timing to calculate the current position of the workpiece W1. By repeating this calculation process, a process of tracking the workpiece W1 is realized.

In step S3, the workpiece W1 is assumed to exit the imaging area AR1. The next imaging process in the imaging unit 125 is not executed until the workpiece W1 exits the imaging area AR1. For example, when the current position of the workpiece W1 is included in the imaging area AR1, the controller 100 does not output the imaging instruction to the image sensor 124. Accordingly, the same workpiece W1 is prevented from being imaged in an overlapping manner.

In step S4, the controller 100 determines whether or not the current position of the workpiece W1 has reached a work area AR2 of the robot 130. When the controller 100 determines that the current position of the workpiece W1 has reached the work area AR2, the controller 100 generates an operation instruction for picking up the workpiece W1 using the current position of the workpiece W1, and transmits the operation instruction to the robot controller 129. The robot controller 129 drives the robot 130 to pick up the workpiece W1 on the basis of the operation instruction received from the controller 100.

Further, the controller 100 transmits the imaging instruction to the image sensor 124 and causes the imaging unit 125 to execute the imaging process on the basis of arrival of the next imaging timing. Accordingly, the workpiece W2 that is a selection target is imaged. Thereafter, a process of identifying a position of the workpiece W2, a process of tracking the workpiece W2, and a process of picking up the workpiece W2 are sequentially executed, as in the above-described workpiece W1.

Although an example in which the image sensor 124 and the imaging unit 125 are configured separately is illustrated in FIG. 1, the image sensor 124 and the imaging unit 125 may be configured integrally. Further, although an example in which the controller 100 and the image sensor 124 are configured separately is illustrated in FIG. 1, the controller 100 and the image sensor 124 may be configured integrally. Further, although an example in which the controller 100 and the robot controller 129 are configured separately is illustrated in FIG. 1, the controller 100 and the robot controller 129 may be configured integrally.

<B. Related Art>

Figure 3:
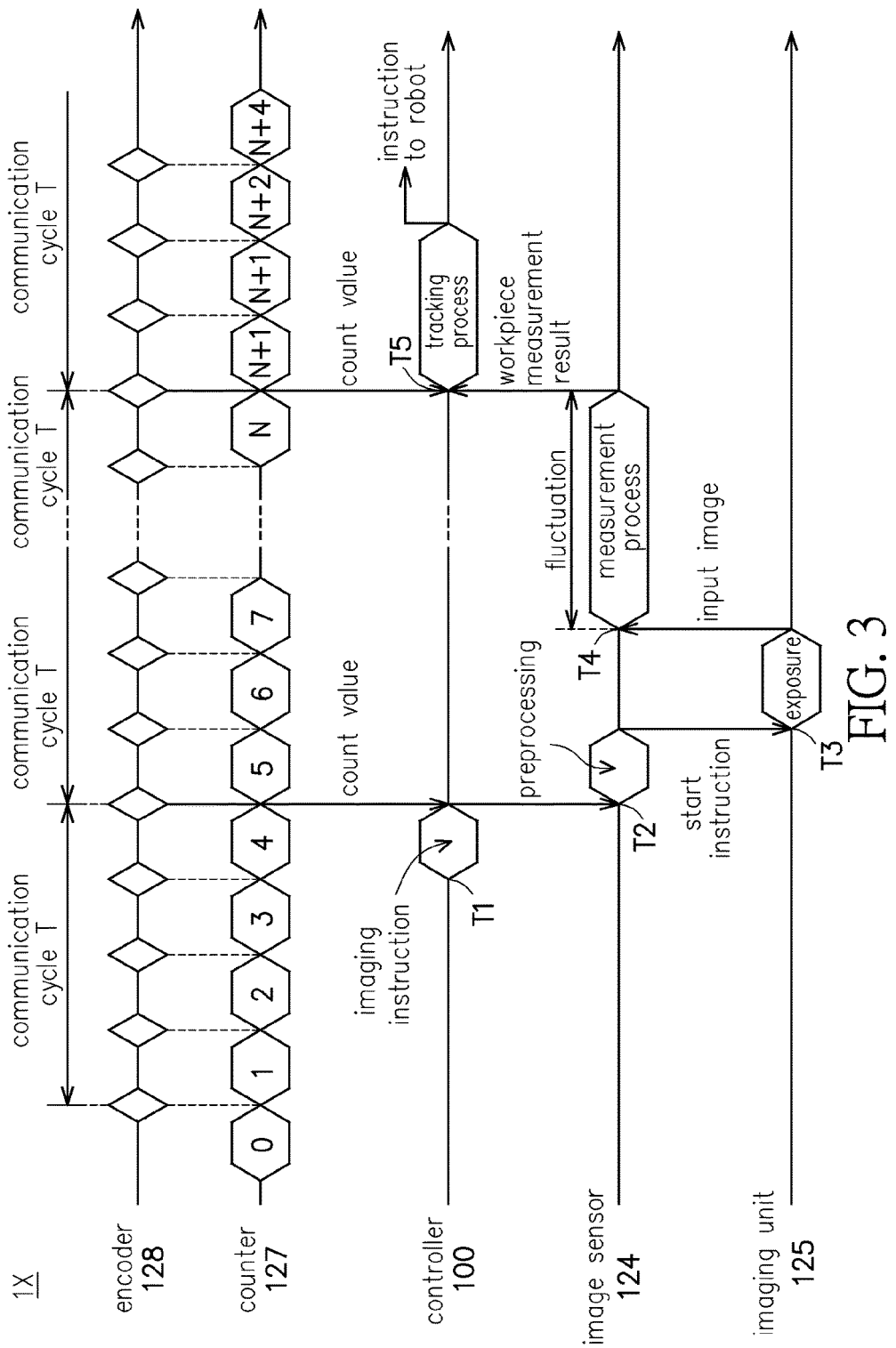
FIG. 3 is a time chart illustrating a control operation in an information processing system according to a related art.

Problems of an information processing system 1X according to the related art will be described with reference to FIG. 3. FIG. 3 is a time chart illustrating a control operation in the information processing system 1X according to the related art.

As illustrated in FIG. 3, the information processing system 1X includes a controller 100, an image sensor 124, a counter 127, and an encoder 128.

The encoder 128 outputs a pulse wave to the counter 127 each time the conveyor 123 moves a predetermined amount. The counter 127 counts up the pulse wave to measure a movement amount of the conveyor 123. The counter 127 transmits a count value of the pulse wave to the controller 100 at a certain communication cycle T.

On the other hand, the controller 100 is assumed to have received an imaging instruction of a workpiece at time T1. Accordingly, the controller 100 transmits the imaging instruction to the image sensor 124. At time T2, the image sensor 124 executes preprocessing of the imaging process of the workpiece. At time T3, the image sensor 124 starts exposure of the imaging unit 125 on the basis of completion of the preprocessing. At time T4, the image sensor 124 acquires an input image acquired through the exposure process from the imaging unit 125 on the basis of end of the exposure of the imaging unit 125. The image sensor 124 starts a workpiece measurement process for the input image. For example, the image sensor 124 measures the position of the workpiece within the input image through image processing such as pattern matching. The position of the workpiece is represented by a coordinate value in the camera coordinate system.

At time T5, the controller 100 calculates a reference position of the workpiece at the imaging timing on the basis of the count value at the time of imaging (hereinafter also referred to as a "reference count value") and the coordinate value of the workpiece in the camera coordinate system. Thereafter, the controller 100 receives the current count value from the counter 127, calculates the movement amount of the workpiece from the imaging timing on the basis of a difference between the current count value and the reference count value, and adds the movement amount to the reference position of the workpiece. Thus, the current position of the workpiece is sequentially updated and the tracking of the workpiece is realized.

Thus, the controller 100 tracks the workpiece on the basis of the reference count value at the time of imaging. Therefore, it is important to accurately measure the reference count value. In the information processing system 1X according to the related art, a sampling period of the count value depends on a communication cycle between the controller 100 and the counter 127 since the count value is acquired at each communication cycle T. Therefore, a change in the count value between the communication cycles cannot be measured. Therefore, in the information processing system 1X according to the related art, the reference count value deviates from the imaging timing, and accuracy of the tracking process is degraded.

<C. Oversampling Process>

In order to suppress the deviation of the reference count value described above, the information processing system 1 according to this embodiment oversamples the count value at intervals shorter than the communication cycle T between the controller 100 and the counter 127. Since the count value is oversampled, the reference count value can be accurately measured without being restricted by the communication cycle T.

Figure 4:
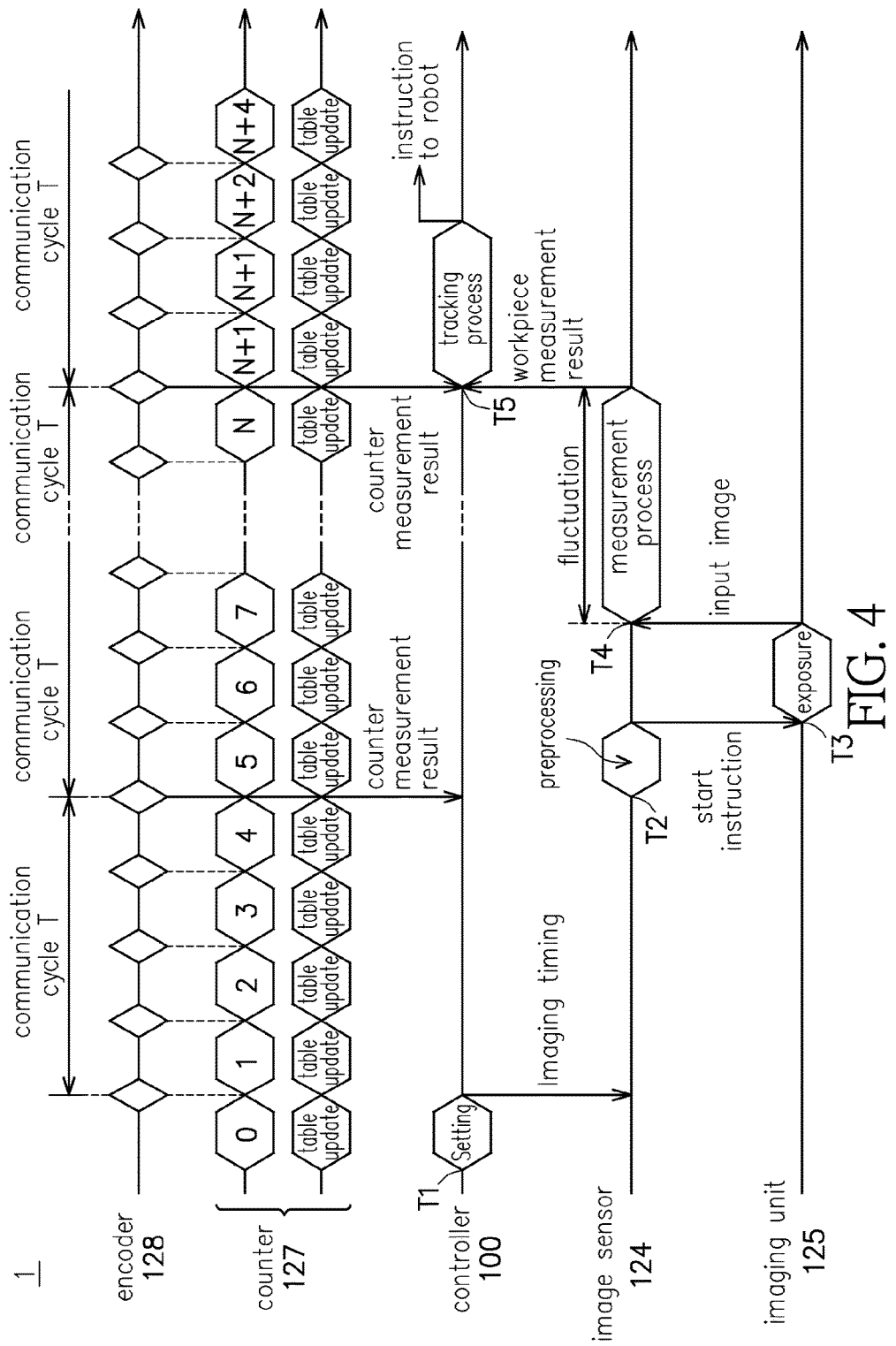
FIG. 4 is a time chart illustrating a control operation in the information processing system according to the embodiment.

Hereinafter, an oversampling process in the information processing system 1 will be described with reference to FIGS. 4 to 8. FIG. 4 is a time chart illustrating a control operation in the information processing system 1 according to this embodiment.

The counter 127 measures the count value a plurality of times at intervals shorter than the cycle of communication with the controller 100. That is, the counter 127 measures the count value a plurality of times between a previous transmission timing for the controller 100 and the next transmission timing. In this case, the measured count value and a measurement timing for the count value are stored in the counter 127 as a counter measurement result 127A illustrated in FIG. 5. FIG. 5 is a diagram illustrating an example of a data structure of the counter measurement result 127A. As illustrated in FIG. 5, in the counter measurement result 127A, the measurement timing is associated with each count value. For example, a measurement interval of each count value is 10 microseconds. The counter 127 transmits the counter measurement result 127A to the controller 100 on the basis of arrival of a transmission timing of the counter measurement result 127A.

FIGS. 6(A) and 6(B) are diagrams illustrating a relationship between the count value and the measurement timing as a graph. More specifically, in FIG. 6(A), a relationship between the count value and the measurement timing in a case the count value is measured a plurality of times during a communication interval ΔT between the controller 100 and the counter 127 is illustrated. In FIG. 6(B), a relationship between the count value and the measurement timing in a case the count value is measured once during the communication interval ΔT is illustrated. As illustrated in FIG. 6(A), the count value is not simply in proportion to the measurement timing, but fluctuates due to a variety of factors. Therefore, as the number of times the count value is measured during the communication interval ΔT increases, the fluctuation in the count value is more accurately recognized.

Referring back to FIG. 4, the measured count value is transmitted as the counter measurement result 127A to the controller 100. The controller 100 receives the counter measurement result 127A from the counter 127 and receives a result of measurement of the workpiece from the image sensor 124.

More specifically, at time T1, the controller 100 is assumed to receive a setting of a workpiece imaging timing. Accordingly, the controller 100 transmits the set imaging timing to the image sensor 124. At time T2, the set imaging timing is assumed to arrive. Accordingly, the image sensor 124 performs preprocessing of a workpiece imaging process. At time T3, the image sensor 124 starts exposure of the imaging unit 125 on the basis of completion of the preprocessing.

At time T4, the image sensor 124 acquires an image obtained through the exposure process from the imaging unit 125 on the basis of the end of the exposure of the imaging unit 125. The image sensor 124 starts a process of measuring a workpiece in the image. For example, the image sensor 124 measures a position of the workpiece within the image through image processing such as pattern matching. The position of the workpiece is represented by a coordinate value in the camera coordinate system. A result of the measurement of the workpiece is written as a workpiece measurement result 124A illustrated in FIG. 7. FIG. 7 is a diagram illustrating an example of a data structure of the workpiece measurement result 124A. As illustrated in FIG. 7, in the workpiece measurement result 124A, an identification number of each measured workpiece and a coordinate value of each workpiece represented by the camera coordinate system are associated with each other.

Referring back to FIG. 4, at time T5, the controller 100 receives the workpiece measurement result 124A from the image sensor 124. Then, the controller 100 identifies one or more measurement timings relatively close to the set imaging timing at time T1 from among a plurality of measurement timings defined in the counter measurement result 127A, and identifies the count value (movement amount) associated with the measurement timing as a reference count value. The controller 100 adds the movement amount of the workpiece according to an elapsed time from the imaging timing to the reference position to calculate the current position of the workpiece. The tracking process is realized by repeating such a calculation process.

More specifically, the controller 100 calculates the movement amount of the workpiece according to the elapsed time from the imaging timing on the basis of a difference between the current count value received from the counter 127 and the reference count value. The controller 100 adds the movement amount to the reference position of the workpiece to calculate the current position of the workpiece.

The controller 100 outputs an operation instruction to the robot 130 (see FIG. 1) using the current position of the workpiece that is sequentially updated. Accordingly, the robot 130 can recognize the current position of the workpiece and pick up the workpiece.

As described above, since the reference count value at the time of imaging is selected from among the oversampled count values, the reference count value at the time of imaging is accurately recognized without being restricted by the communication cycle T between the controller 100 and the counter 127. As a result, accuracy of the tracking process is improved.

<D. Functional Configuration of Information Processing System 1>

Figure 8:
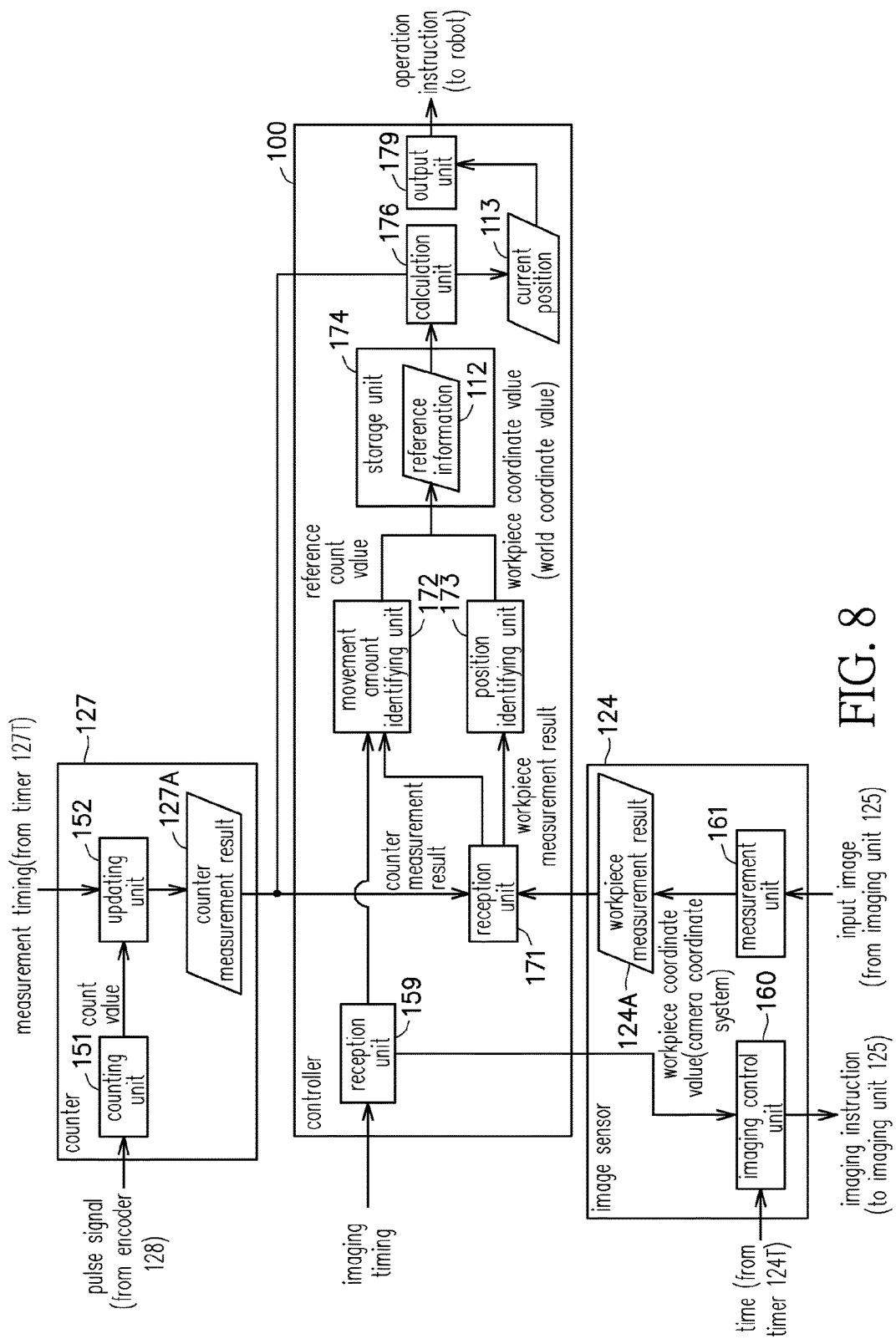
FIG. 8 is a diagram illustrating an example of a functional configuration of the information processing system according to the embodiment.

A functional configuration of the information processing system 1 according to this embodiment will be described with reference to FIG. 8. FIG. 8 is a diagram illustrating an example of the functional configuration of the information processing system 1.

As illustrated in FIG. 8, the information processing system 1 includes the controller 100, the image sensor 124, and the movement amount measurement device 126. The controller 100 includes, as a functional configuration, a reception unit 159, a movement amount identifying unit 172, a position identifying unit 173, a storage unit 174, a calculation unit 176, and an output unit 179. The image sensor 124 includes, as a functional configuration, an imaging control unit 160 and a measurement unit 161. The counter 127 includes, as a functional configuration, a counting unit 151 and an updating unit 152.

The counting unit 151 counts the number of pulses included in the pulse wave generated from the encoder 128 (see FIG. 1). A measurement interval of the count value is shorter than the communication cycle between the controller 100 and the counter 127. Accordingly, oversampling of the count value is realized. The counting unit 151 outputs the count value to the updating unit 152 each time the counting unit 151 counts up the count value.

If the updating unit 152 receives the count value from the counting unit 151, the updating unit 152 associates the count value with the current time, and then writes the count value and the current time as the above-described counter measurement result 127A (see FIG. 5). Accordingly, the measurement timing of each count value is written as the counter measurement result 127A. The counter measurement result 127A is transmitted to the controller 100 at each communication cycle between the controller 100 and the counter 127.

The reception unit 159 receives a setting of the imaging timing for the imaging unit 125 (see FIG. 1). The setting of the imaging timing is performed, for example, with respect to a setting screen displayed on the display unit 120 (see FIG. 1). For example, an input operation with respect to the setting screen is realized by a user operation with respect to the operation unit 122 (see FIG. 1).

In a certain aspect, the reception unit 159 receives, as the imaging timing, a setting of at least one of an exposure start time of the imaging unit 125 and an exposure end time of the imaging unit 125. In another aspect, the reception unit 159 receives, as the imaging timing, a setting of a workpiece imaging interval in the imaging unit 125. The set imaging timing is transmitted to the image sensor 124.

The imaging control unit 160 outputs an imaging instruction to the imaging unit 125 on the basis of the imaging timing received from the controller 100. More specifically, the imaging control unit 160 compares a time indicated by a timer 124T (see FIG. 10) to be described below with the imaging timing designated from the controller 100, and outputs the imaging instruction to the imaging unit 125 when a result of the comparison satisfies a predetermined condition.

For example, when the exposure start timing is designated as the imaging timing, the imaging control unit 160 outputs the imaging instruction to the imaging unit 125 when the time of the timer 124T matches or substantially matches the designated exposure start timing. When the exposure end timing is designated as the imaging timing, the imaging control unit 160 outputs the imaging instruction to the imaging unit 125 when the time of the timer 124T matches or substantially matches a time before a predetermined time from the designated exposure end timing. Alternatively, when the imaging interval is designated as the imaging timing, the imaging control unit 160 measures the imaging interval using the timer 124T and sequentially outputs the imaging instruction to the imaging unit 125 at imaging intervals.

The measurement unit 161 measures the coordinate value of the workpiece within the input image on the basis of reception of the input image obtained by imaging the workpiece from the imaging unit 125. The coordinate value is represented by the camera coordinate system. The measured coordinate value is written as the workpiece measurement result 124A (see FIG. 7) described above.

The reception unit 171 receives the counter measurement result 127A from the controller 100 at each certain communication cycle. The received counter measurement result 127A is output to the movement amount identifying unit 172. Further, the reception unit 171 (acquisition unit) receives the workpiece measurement result 124A from the image sensor 124 at regular communication intervals. The workpiece measurement result 124A defines the position of the workpiece measured from the image obtained through the imaging process based on the set imaging timing. The received workpiece measurement result 124A is output to the position identifying unit 173.

The movement amount identifying unit 172 identifies one or more measurement timings relatively close to the imaging timing received by the reception unit 159 from among the measurement timings defined in the counter measurement result 127A, and identifies, as the reference count value, the count value associated with the measurement timing. The reference count value is output to the storage unit 174.

The position identifying unit 173 converts the coordinate value of each workpiece of the camera coordinate system defined in the workpiece measurement result 124A into a coordinate value of a conveyor coordinate system on the basis of a predefined coordinate transformation expression. The coordinate transformation expression is defined on the basis of a positional relationship between the imaging unit 125 and the conveyor. The coordinate value of each workpiece after transformation is output as the reference position of the workpiece to the storage unit 174.

The storage unit 174 associates the reference count value identified by the movement amount identifying unit 172 with the reference position of the workpiece on the conveyor identified by the position identifying unit 173, and stores a result thereof as reference information 112.

The calculation unit 176 receives the current count value from the counter 127, calculates the movement amount of the workpiece from the imaging timing on the basis of the difference between the current count value and the reference count value defined in the reference information 112, and adds the movement amount to the reference position of the workpiece to calculate a current position 113 of the workpiece. Typically, a process of calculating the current position 113 is executed each time a count value is newly received from the counter 127. Accordingly, the current position 113 of the workpiece is sequentially calculated and a process of tracking the workpiece is realized.

The output unit 179 outputs an operation instruction for picking up the workpiece to the robot controller 129 (see FIG. 1) on the basis of arrival of the current position 113 of the workpiece at the work area AR2 of the robot 130 (see FIG. 1). Accordingly, the robot controller 129 moves an arm portion of the robot 130 to the current position of the workpiece and causes the robot 130 to pick up the workpiece. Then, the robot 130 moves the workpiece to a predetermined place and releases the workpiece.

Although the example in which the function of the measurement unit 161 is implemented in the image sensor 124 has been described with reference to FIG. 8, the function of the measurement unit 161 may be implemented in the controller 100. Further, although the example in which the functions of the reception unit 159, the movement amount identifying unit 172, the position identifying unit 173, the storage unit 174, the calculation unit 176, and the output unit 179 are implemented in the controller 100 has been described with reference to FIG. 8, at least one of the functions may be implemented in the image sensor 124 or may be implemented in the robot controller 129 (see FIG. 1).

<E. Process of Identifying Reference Count Value>

As described above with reference to FIG. 5, each count value and the measurement timing of the count value are defined in the counter measurement result 127A. The movement amount identifying unit 172 (see FIG. 8) identifies one or more measurement timings relatively close to the set imaging timing from among the measurement timing defined in the counter measurement result 127A, and identifies the count value associated with the measurement timing as the reference count value.

Various methods are conceivable as a method of identifying the reference count value. In a certain aspect, the movement amount identifying unit 172 identifies the measurement timing closest to the workpiece imaging timing from among the plurality of measurement timings defined in the counter measurement result 127A, and identifies the count value associated with the measurement timing as the reference count value.

Figure 9:
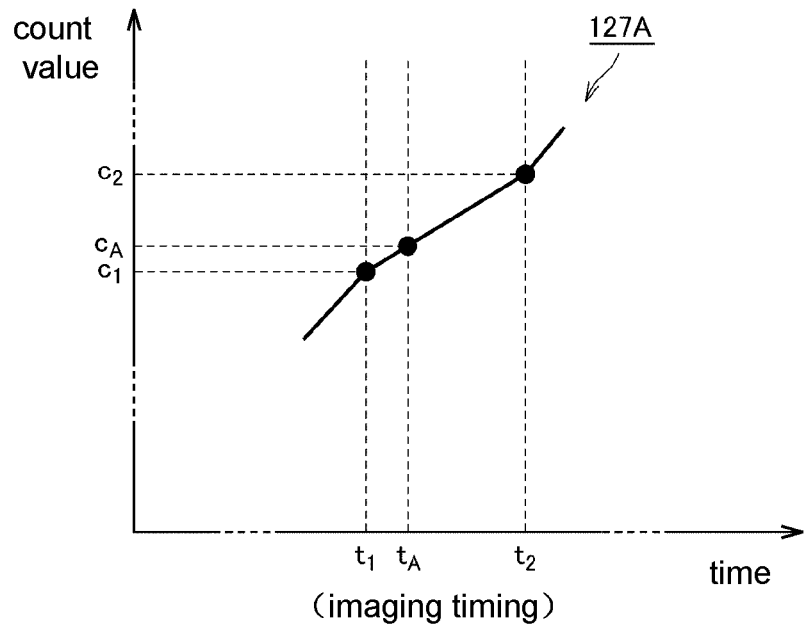
FIG. 9 is an enlarged diagram of a portion of a counter measurement result.

In another aspect, the movement amount identifying unit 172 identifies the first measurement timing closest to the set imaging timing and the second measurement timing second closest to the set imaging timing from among the measurement timings defined in the counter measurement result 127A. The movement amount identifying unit 172 identifies the reference movement amount to be between the count value associated with the first measurement timing and the count value associated with the second measurement timing. Hereinafter, an identifying method will be described with reference to FIG. 9. FIG. 9 is an enlarged diagram of a portion of the counter measurement result 127A.

The imaging timing $t_A$ indicates a workpiece imaging time. The movement amount identifying unit 172 identifies a measurement timing $t_1$ closest to the imaging timing $t_A$, and a measurement timing $t_2$ second closest to the imaging timing $t_A$. The movement amount identifying unit 172 identifies a reference count value $c_A$ to be between a count value $c_1$ associated with the measurement timing $t_1$ and a count value $c_2$ associated with the measurement timing $t_2$. In other words, the movement amount identifying unit 172 pedal is interpolation between the count values $c_1$ and $c_2$, and then identifies the reference count value corresponding to the imaging timing $t_A$.

Preferably, the movement amount identifying unit 172 identifies the reference count value $c_A$ to be close to the count value $c_1$ associated with the measurement timing $t_1$ (a first measurement timing) closest to the imaging timing $t_A$ than to the count value $c_2$ associated with the measurement timing $t_2$ (a second measurement timing) second closest to the imaging time $t_A$. More specifically, the movement amount identifying unit 172 identifies the reference count value $c_A$ on the basis of Equation (1) below.

$$c_A = \{c_1(t_2-t_A)-c_2(t_1-t_A)\}/(t_2-t_1) \quad (1)$$

Thus, the count value is interpolated and then the reference count value $c_A$ is identified. Accordingly, even when a count value to be measured is discrete, the reference count value $c_A$ at the imaging timing is accurately identified.

In still another aspect, the movement amount identifying unit 172 may generate an approximation expression indicating a relationship between the count value and the measurement timing on the basis of the count value defined in the counter measurement result 127A and the measurement timing, and identify the reference count value $c_A$ by applying the imaging timing to the approximation expression. The approximation expression is determined by, for example, a least square method or the like.

<F. Synchronization Process>

Figure 10:
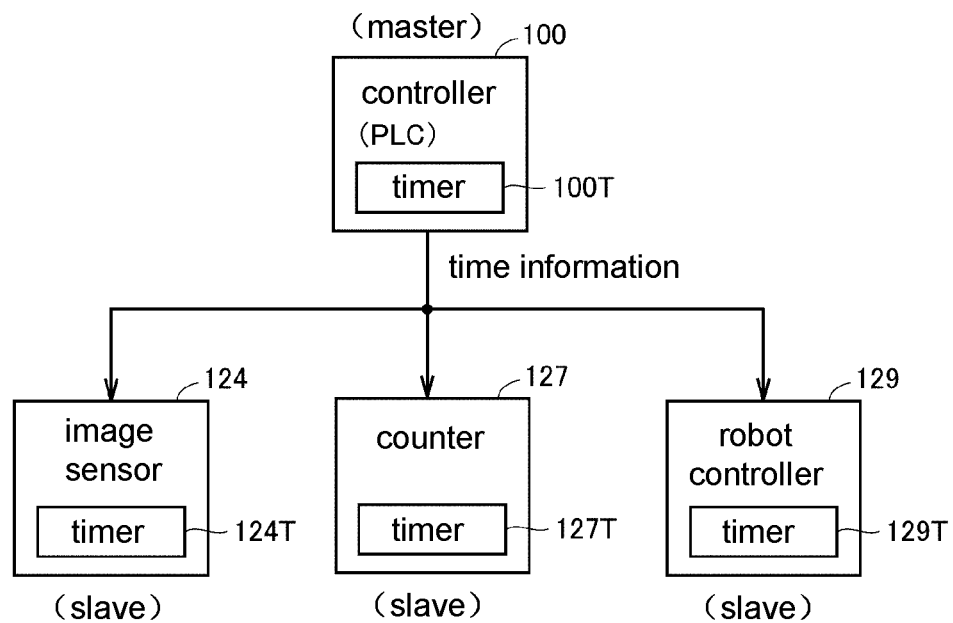
FIG. 10 is a conceptual diagram schematically illustrating a timer synchronization process.

As described above, in order to identify the reference count value, the measurement timing of each count value is compared with the imaging timing. Therefore, it is preferable for a timer that measures the measurement timing of each count value and a timer that measures the imaging timing to be synchronized. Hereinafter, a timer synchronization process will be described with reference to FIG. 10. FIG. 10 is a conceptual diagram schematically illustrating the timer synchronization process.

As illustrated in FIG. 10, the information processing system 1 includes the controller 100, the image sensor 124, the counter 127, and the robot controller 129. The controller 100 includes a timer 100T. The image sensor 124 includes a timer 124T for measuring a timing at which the workpiece is imaged. The counter 127 includes a timer 127T for measuring the measurement timing of the count value. The robot 130 includes a timer 129T.

One of the timers 100T, 124T, 127T, and 129T functions as a master, and the other timers function as slaves. That is, the timers functioning as the slaves are synchronized according to the timer serving as the master. In the example of FIG. 10, the timer 100T of the controller 100 is set as the master.

The controller 100 transmits a time of the timer 100T to the image sensor 124, the counter 127, and the robot controller 129 at a certain period. If the image sensor 124 receives the time from the controller 100, the image sensor 124 corrects the timer 124T according to the time. Similarly, if the counter 127 receives the time from the controller 100, the counter 127 corrects the timer 127T according to the time. Similarly, if the robot controller 129 receives the time from the controller 100, the robot controller 129 modifies the timer 129T according to the time. Accordingly, the timers 124T, 127T, and 129T are synchronized with the timer 100T.

In this embodiment, it is not necessary for all of the timers 100T, 124T, 127T, and 129T to be synchronized. It would be sufficient as long as at least the timer 124T (a first timer) for measuring a timing at which the workpiece is imaged and the timer 127T (a second timer) for measuring the measurement timing of the count value are synchronized. This is because synchronizing the timers 124T and 127T is sufficient for identifying the reference count value. The imaging timing and the measurement timing of the count value are measured in a state in which the timers 124T and 127T are synchronized. Thus, it is possible to accurately obtain the measurement timing corresponding to the imaging timing.

<G. Functional Block>

Figure 11:
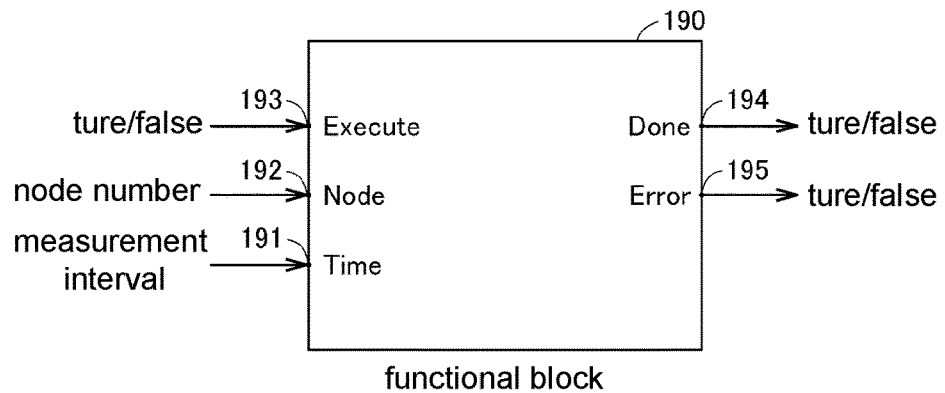
FIG. 11 is a conceptual diagram schematically illustrating a functional block.

A program for realizing the above-described oversampling function is provided as a functional block. The functional block will be described with reference to FIG. 11. FIG. 11 is a conceptual diagram schematically illustrating a functional block 190.

The functional block 190 is stored in, for example, a main memory 102 of the controller 100 (see FIG. 15), a storage device 110 (see FIG. 15), or the like. The functional block 190 includes reception units 191 to 193 that receive a setting for the oversampling function, and output units 194 and 195 that output a response to the setting.

The reception unit 191 receives a setting of the measurement interval of the count value in the counter 127. That is, the measurement interval of the counter 127 may be arbitrarily changed by setting the measurement interval for the reception unit 191.

The reception unit 192 receives an identification number of the counter that is a target of the setting of the measurement interval. That is, the counter whose measurement interval is to be changed is designated by a setting of the identification number for the reception unit 192.

The reception unit 193 receives an input of a variable for designating whether or not the measurement interval is changed. For example, if the reception unit 193 receives "TRUE," the measurement interval is changed. If the reception unit 193 receives "FALSE," the measurement interval is not changed.

The output unit 194 or 195 outputs an indication of whether or not the measurement interval has been changed normally. For example, when the measurement interval is changed normally, the output unit 194 outputs "TRUE," and the output unit 195 outputs "FALSE." On the other hand, when the measurement interval is not changed normally, the output unit 194 outputs "FALSE" and the output unit 195 outputs "TRUE."

<H. Flowchart>

Figure 12:
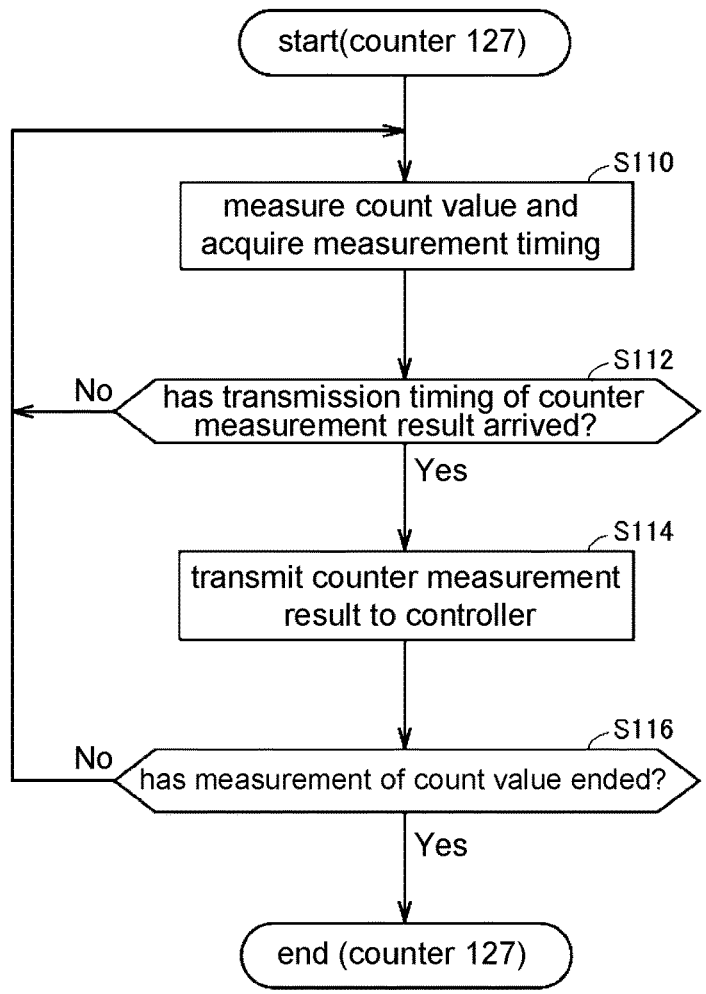
FIG. 12 is a flowchart illustrating a portion of a process that is executed by a counter according to the embodiment.
Figure 13:
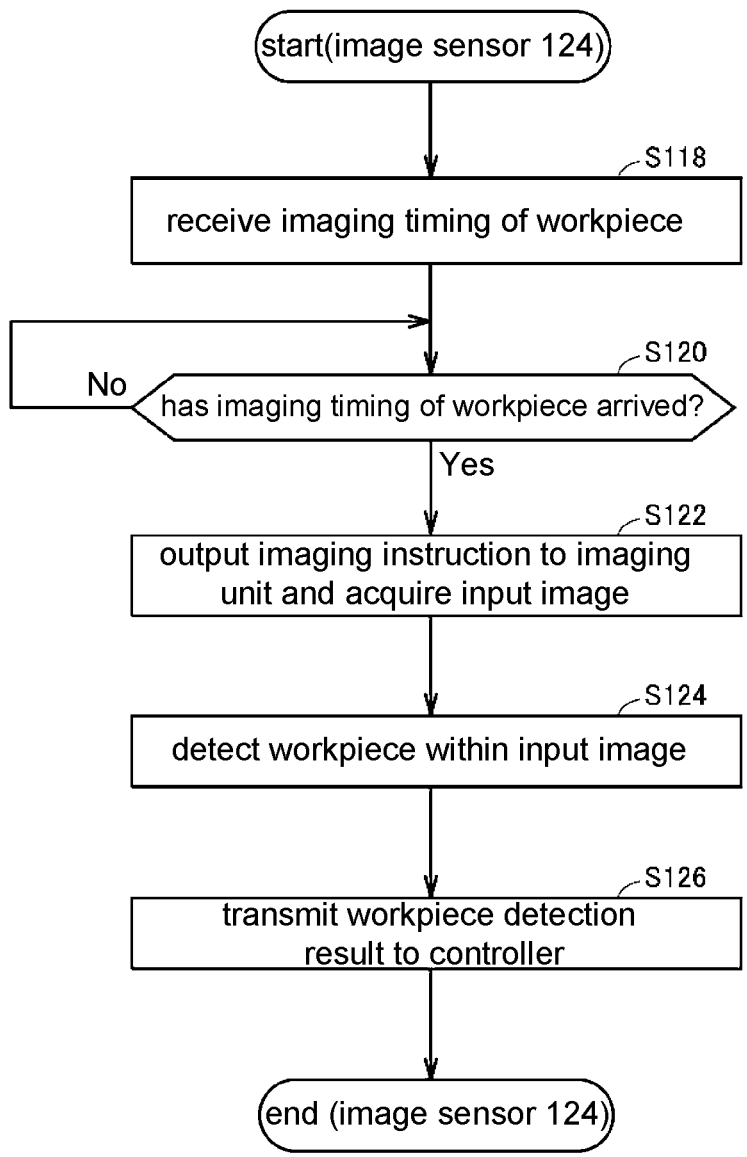
FIG. 13 is a flowchart illustrating a portion of a process that is executed by an image sensor according to the embodiment.
Figure 14:
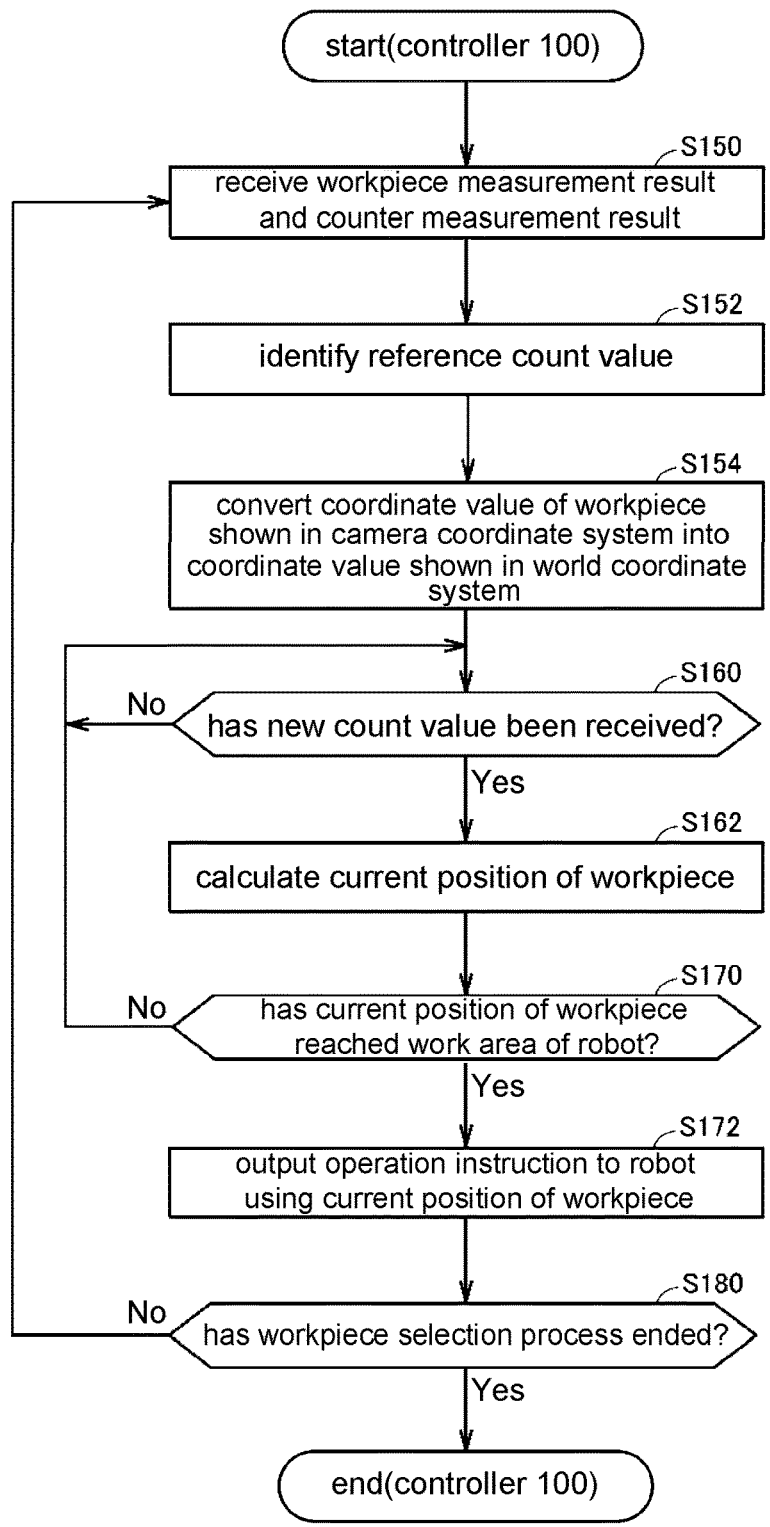
FIG. 14 is a flowchart illustrating a portion of a process that is executed by a controller according to the embodiment.

A control structure of the information processing system 1 will be described with reference to FIGS. 12 to 14. FIG. 12 is a flowchart illustrating a portion of a process that the counter 127 constituting the information processing system 1 executes. FIG. 13 is a flowchart illustrating a portion of a process that the image sensor 124 constituting the information processing system 1 executes. FIG. 14 is a flowchart illustrating a portion of a process that the controller 100 constituting the information processing system 1 executes.

Hereinafter, control flows of the counter 127, the image sensor 124, and the controller 100 will be described in order.

(H1. Control Structure of Counter 127)

First, the control flow of the counter 127 will be described with reference to FIG. 12. A process in FIG. 12 is realized by a control device of the counter 127 executing a program. In another aspect, a portion or all of the process may be executed by a circuit element or other hardware.

In step S110, the counter 127, as the above-described counting unit 151 (see FIG. 8), receives the pulse wave from the encoder 128 (see FIG. 1) and counts the number of pulses included in the pulse wave. A count value of the number of pulses indicates the movement amount of the conveyor 123 (see FIG. 1). Further, the counter 127 acquires a timing at which the count value has been measured as the measurement timing from the timer 127T (see FIG. 10). The measured count value and the measurement timing are associated with each other in the above-described counter measurement result 127A (see FIG. 5).

In step S112, the counter 127 determines whether or not the transmission timing of the counter measurement result 127A has arrived. The transmission timing arrives at each communication cycle between the controller 100 and the counter 127. Whether or not the transmission timing of the counter measurement result 127A has arrived is determined, for example, on the basis of the time of the timer 127T (see FIG. 10). When the counter 127 determines that the transmission timing of the counter measurement result 127A has arrived (YES in step S112), the counter 127 switches the control to step S114. Otherwise (NO in step S112), the counter 127 causes the control to return to step S110.

In step S114, the counter 127 transmits the counter measurement result 127A to the controller 100. The counter measurement result 127A may be deleted at a time point at which the counter measurement result 127A has been transmitted to the controller 100.

In step S116, the counter 127 determines whether or not to end the measurement of the count value. For example, the counter 127 determines to end the measurement of the count value on the basis of reception of an operation to end a workpiece selection process. When the counter 127 determines to end the measurement of the count value (YES in step S116), the counter 127 ends the process illustrated in FIG. 12. Otherwise (NO in step S116), the counter 127 causes the control to return to step S110.

(H2. Control Structure of Image Sensor 124)

Next, a control flow of the image sensor 124 will be described with reference to FIG. 13. A process in FIG. 13 is realized by a control device of the image sensor 124 executing a program. In another aspect, a portion or all of the process may be executed by a circuit element or other hardware.

In step S118, the image sensor 124 receives the imaging timing set by the controller 100 from the controller 100. For example, the image sensor 124 receives at least one of the exposure start time of the imaging unit 125 and the exposure end time of the imaging unit 125 as the imaging timing.

Alternatively, the image sensor 124 receives a workpiece imaging interval in the imaging unit 125 as the imaging timing.

In step S120, the image sensor 124, as the above-described imaging control unit 160 (see FIG. 8), determines whether or not the designated imaging timing has arrived. For example, the image sensor 124 compares the designated imaging timing with the time of the timer 124T (see FIG. 10) to determine whether or not the designated imaging timing has arrived. When the image sensor 124 determines that the workpiece imaging timing has arrived (YES in step S120), the image sensor 124 switches the control to step S122. Otherwise (NO in step S120), the image sensor 124 executes the process of step S120 in the control again.

In step S122, the image sensor 124 outputs an imaging instruction to the imaging unit 125 (see FIG. 1) to cause the imaging unit 125 to image the workpiece that is conveyed on the conveyor. Accordingly, the image sensor 124 acquires the input image from the imaging unit 125. In this case, the image sensor 124 acquires the workpiece imaging timing from the timer 124T (see FIG. 10).

In step S124, the image sensor 124, as the above-described measurement unit 161 (see FIG. 8), measures the workpiece within the input image. For example, the image sensor 124 measures the position of the workpiece within the image through image processing such as pattern matching. The position of the workpiece is represented by a coordinate value in the camera coordinate system. The coordinate values of the workpiece and the imaging timing acquired in step S122 are associated in the above-described workpiece measurement result 124A (see FIG. 7).

In step S126, the image sensor 124 transmits the workpiece measurement result 124A to the controller 100. The workpiece measurement result 124A may be deleted at a time point at which the workpiece measurement result 124A is transmitted to the controller 100.

(H3. Control Structure of Controller 100)

Next, a control flow of the controller 100 will be described with reference to FIG. 14. A process in FIG. 14 is realized by a control device 101 of the controller 100 (see FIG. 15) executing a program. In another aspect, a portion or all of the process may be executed by a circuit element or other hardware.

In step S150, the controller 100, as the above-described reception unit 171 (see FIG. 8), receives the workpiece measurement result 124A (see FIG. 7) from the image sensor 124. Further, the controller 100 receives the counter measurement result 127A (see FIG. 5) from the counter 127.

In step S152, the controller 100, as the above-described movement amount identifying unit 172 (see FIG. 8), identifies one or more measurement timings relatively close to the set imaging timing from among the measurement timings defined in the counter measurement result 127A, and identifies the count value associated with the measurement timing as the reference count value. A method of identifying the reference count value is as described with reference to FIG. 9 described above.

In step S154, the controller 100, as the above-described position identifying unit 173 (see FIG. 8), converts the coordinate value of each workpiece of the camera coordinate system defined in the workpiece measurement result 124A into a coordinate value of a conveyor coordinate system on the basis of a predefined coordinate transformation expression. The coordinate transformation expression is defined on the basis of a positional relationship between the conveyor 123 and the imaging unit 125. The coordinate value of each workpiece after transformation is stored as reference position.

In step S160, the controller 100 determines whether or not the controller 100 has received the current count value from the counter 127. When the controller 100 determines that the controller 100 has received the current count value from the counter 127 (YES in step S160), the controller 100 switches the control to step S162. Otherwise (NO in step S160), the controller 100 executes the process of step S160 again.

In step S162, the controller 100, as the above-described calculation unit 176 (see FIG. 8), calculates the movement amount from the imaging timing for each workpiece on the basis of a difference between the current count value received in step S160 and the reference count value identified in step S152. Typically, a unit movement amount per count is predefined, and the controller 100 calculates a result of multiplying the difference between the current count value and the reference count value by the unit movement amount as the movement amount of the workpiece from the imaging timing. The controller 100 adds the movement amount to the reference position of each workpiece to calculate the current position of each workpiece. Tracking of the workpiece is realized by repeating the calculation process in step S162.

In step S170, the controller 100 determines whether or not the current position of the workpiece has reached the work area AR2 of the robot 130 (see FIG. 1). When the controller 100 determines that the current position of the workpiece has reached the work area AR2 of the robot 130 (YES in step S170), the controller 100 switches the control to step S170. Otherwise (NO in step S170), the controller 100 causes the control to return to step S160.

In step S172, the controller 100, as the above-described output unit 179 (see FIG. 8), outputs an operation instruction for picking up the workpiece using the current position of the workpiece to the robot controller 129 (see FIG. 1). Accordingly, the robot controller 129 moves an arm portion of the robot 130 to the current position of the workpiece and causes the robot 130 to pick up the workpiece. Then, the robot 130 moves the workpiece to a predetermined place and releases the workpiece. Preferably, a movement destination of the workpiece may be changed for each type of workpiece. Accordingly, the workpiece that is conveyed on the conveyor is selected according to a type thereof.

In step S180, the controller 100 determines whether or not to end the workpiece selection process. For example, the controller 100 determines to end the workpiece selection process on the basis of reception of an end operation. When the controller 100 determines to end the workpiece selection process (YES in step S180), the controller 100 ends the process illustrated in FIG. 14. Otherwise (NO in step S180), the controller 100 causes the control to return to step S150.

<I. Hardware Configuration of Controller 100>

Figure 15:
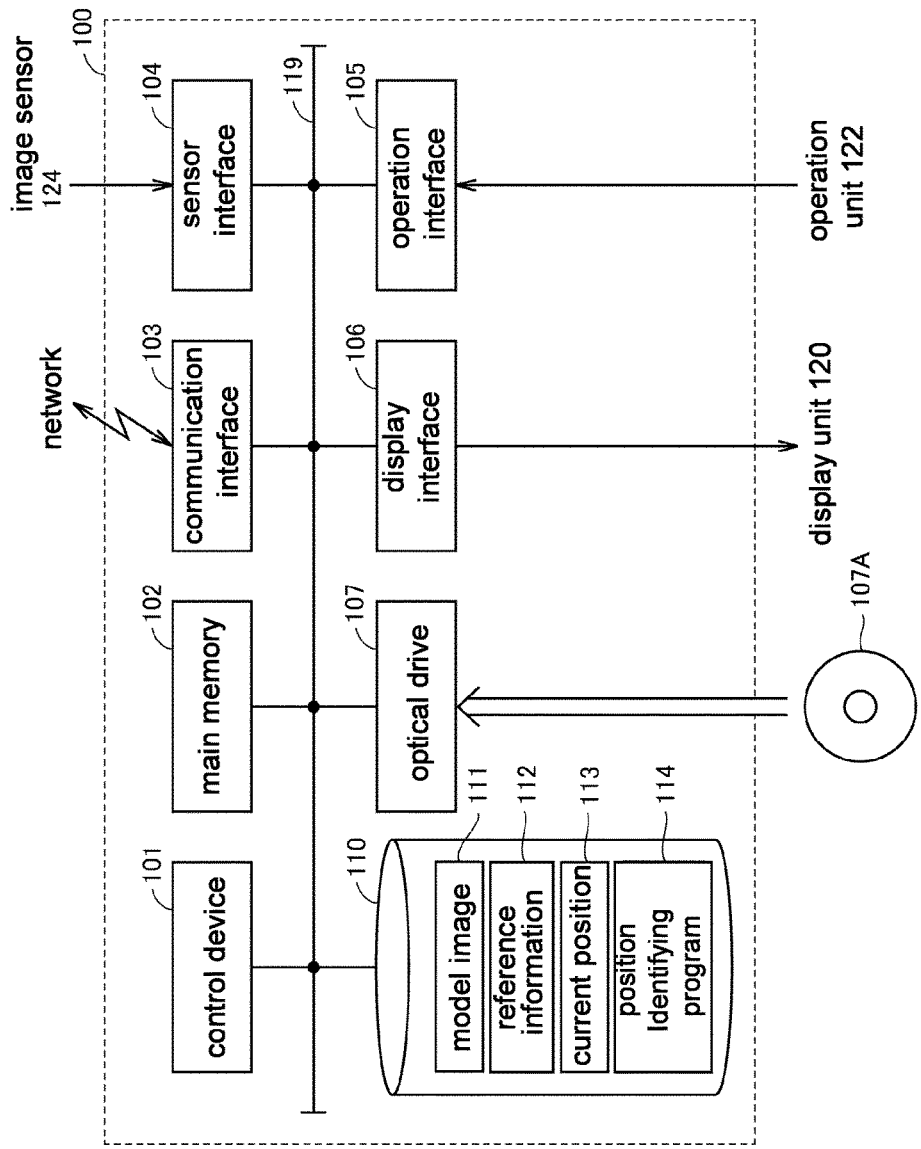
FIG. 15 is a schematic diagram illustrating a hardware configuration of the controller according to the embodiment.

A hardware configuration of the controller 100 according to this embodiment will be described with reference to FIG. 15. FIG. 15 is a schematic diagram illustrating the hardware configuration of the controller 100 according to this embodiment.

The controller 100 includes, for example, a computer configured according to a general-purpose computer architecture. The controller 100 is, for example, a PLC. The controller 100 includes a control device 101, a main memory 102, a communication interface 103, a sensor interface 104, an operation interface 105, a display interface 106, an optical drive 107, and a storage device 110 (storage unit).

The components are communicatively connected to each other through an internal bus 119.

The control device 101 includes, for example, at least one integrated circuit. The integrated circuit includes, for example, at least one central processing unit (CPU), at least one application specific integrated circuit (ASIC), at least one field programmable gate array (FPGA), or a combination thereof. The control device 101 realizes various processes according to this embodiment by loading the position identifying program 114 stored in the storage device 110 into the main memory 102 and executing the position identifying program 114. The main memory 102 includes a volatile memory, and functions as a work memory required for program execution in the control device 101.

The communication interface 103 exchanges data with an external device over a network. The external device includes, for example, the above-described image sensor 124 (see FIG. 1), the above-described counter 127 (see FIG. 1), the above-described robot controller 129 (see FIG. 1), a server, and other communications devices. The controller 100 may be configured to be able to download the position identifying program 114 according to this embodiment via the communication interface 103.

The sensor interface 104 is connected to the above-described image sensor 124. The above-described imaging unit 125 is connected to the image sensor 124, and the sensor interface 104 receives the image signal obtained by imaging in the imaging unit 125, and sends a command such as the imaging timing to the imaging unit 125 via the image sensor 124. The imaging unit 125 includes, for example, an imaging element partitioned into a plurality of pixels, such as a coupled charged device (CCD) or a complementary metal oxide semiconductor (CMOS) sensor, in addition to an optical system such as a lens.

The operation interface 105 is connected to the operation unit 122, and receives a signal indicating a user operation from the operation unit 122. The operation unit 122 typically includes a keyboard, a mouse, a touch panel, a touch pad, or the like, and receives an operation from a user.

The display interface 106 is connected to the display unit 120, and sends an image signal for displaying an image to the display unit 120 according to a command from the control device 101 or the like. The display unit 120 includes a display, an indicator, or the like, and presents various types of information to the user.

The optical drive 107 reads various programs stored in the optical disc 107A or the like from the optical disc 107A or the like, and installs the programs in the storage device 110. The storage device 110 stores, for example, the position identifying program 114.

FIG. 15 illustrates a configuration example in which a necessary program is installed in the controller 100 via the optical drive 107, but the present invention is not limited thereto and the program may be downloaded from a server device or the like on a network. Alternatively, a program of the controller 100 may be configured to be rewritten by a program written to a storage medium such as a Universal Serial Bus (USB) memory, a Secure Digital (SD) card, or a CompactFlash (CF).

The storage device 110 is, for example, a hard disk or an external storage medium. For example, the storage device 110 stores a model image 111 indicating an image of a selection target, the above-described reference information 112 (see FIG. 8), the current position 113 of the workpiece (see FIG. 8), and the position identifying program 114 for realizing various processes according to this embodiment.

The position identifying program 114 may be a program as a single entity and may be incorporated in a portion of an arbitrary program and provided. In this case, the processes according to this embodiment can be realized in cooperation with an arbitrary program. A program that does not include some of these modules does not depart from the spirit of the controller 100 according to this embodiment. Further, some or all of the functions provided by the position identifying program 114 according to this embodiment may be realized by dedicated hardware. Further, at least two of the controller 100, the image sensor 124, the counter 127, and the robot controller 129 may cooperate to realize the process according to this embodiment. Further, the controller 100 may be configured in a form of a so-called cloud service in which at least one server realizes the process according this embodiment.

<J. Modification Example>

Figure 16:
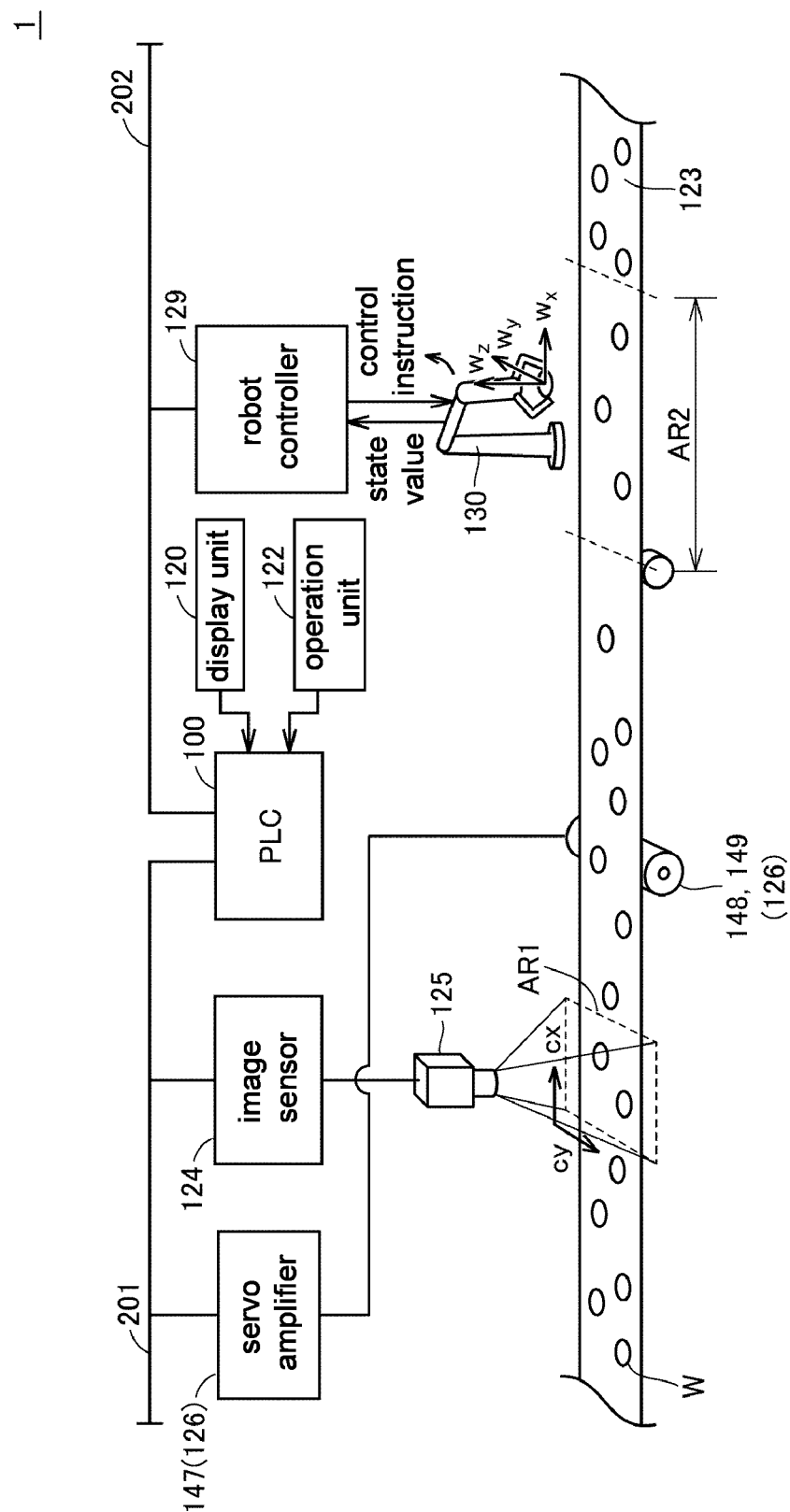
FIG. 16 is a schematic diagram illustrating a basic configuration of an information processing system according to a modification example.

An information processing system 1 according to a modification example will be described with reference to FIG. 16. FIG. 16 is a schematic diagram illustrating a basic configuration of the information processing system 1 according to the modification example.

In the information processing system 1 illustrated in FIG. 1, the movement amount measurement device 126 includes the counter 127 and the encoder 128. On the other hand, in the information processing system 1 according to the modification example, a movement amount measurement device 126 includes a servo amplifier 147, a servo motor 148, and an encoder 149. Since the other points are the same as the information processing system 1 illustrated in FIG. 1, description thereof is not repeated.

The servo motor 148 drives a conveyor 123. The encoder 149 measures a driving amount of the servo motor 148 as the movement amount of the conveyor 123, and sequentially outputs the driving amount to the servo amplifier 147. The driving amount is expressed as, for example, a rotation angle of the servo motor 148.

The servo amplifier 147 measures the driving amount of the conveyor 123 a plurality of times between elapse of a previous transmission timing for the controller 100 and arrival of the next transmission timing, and transmits each measured driving amount and a measurement timing of each driving amount to the controller 100 via the image sensor 124 on the basis of the arrival of the next transmission timing. Since the subsequent process is as described above, a description thereof is not repeated.

The motor for driving the conveyor 123 is not limited to the servo motor 148. For example, the motor for driving the conveyor 123 may be an induction motor. The induction motor is electrically connected to the inverter. Rotation speed of the induction motor is adjusted by controlling a frequency of an alternating voltage output from the inverter. The encoder 149 measures a driving amount of the induction motor as the movement amount of the conveyor 123.

<K. Advantages>

As described above, the controller 100 according to this embodiment receives the setting of the imaging timing and transmits the set imaging timing to the image sensor 124. If the designated imaging timing arrives, the image sensor 124 executes the imaging process of the workpiece and measures the coordinate value of the workpiece within the input image obtained by the imaging process. The measured coordinate value of the workpiece is transmitted to the controller 100.

Meanwhile, the counter 127 measures the count value indicating the movement amount of the conveyor a plurality of times between the previous transmission timing for the controller 100 and the next transmission timing. Accordingly, the count value is measured at intervals shorter than the communication cycle between the controller 100 and the counter 127, and oversampling of the count value is realized. The counter 127 transmits the measured count value and the measurement timing of each count value to the controller 100 on the basis of arrival of the next transmission timing.

The controller 100 identifies one or more measurement timings relatively close to the set imaging timing from among the measurement timings of the respective count values received from the counter 127, and identifies the count value associated with the measurement timing as the reference count value. The controller 100 converts the workpiece coordinate value of the camera coordinate system received from the image sensor 124 into the workpiece coordinate value of the conveyor coordinate system, and stores the coordinate value after the transformation in association with the reference count value. Since the reference count value is identified from the oversampled measurement timing, the workpiece position at the imaging timing is accurately identified.

As another advantage, it is not necessary to provide a wiring between the image sensor 124 and the counter 127. More specifically, when the image sensor 124 and the counter 127 are electrically connected, the image sensor 124 and the counter 127 can exchange the count value without being restricted by the communication cycle, but to that end, it is necessary for the image sensor 124 and the counter 127 to be connected by a wiring. Since the information processing system 1 according to this embodiment can oversample the count value, it is not necessary to provide the wiring between the image sensor 124 and the counter 127. In particular, in recent years, strict food sanitation management is required, and in a robot for food, an entire conveyor system may be cleaned. In this case, it is necessary to provide a wiring between the image sensor 124 and the counter 127 using a waterproof cable, and the aspect of sanitation is a concern. In the information processing system 1 according to this embodiment, it is not necessary to provide a wiring between the image sensor 124 and the counter 127. Accordingly, it is possible to reduce a cost and enhance the aspect of sanitation.

As still another advantage, the information processing system 1 according to this embodiment can be used in a system in which a servo motor is used. More specifically, in some systems, a function of measuring the counter value may be mounted on the image sensor 124 itself rather than the counter 127. Since such an image sensor 124 can measure both the imaging timing and the count value by itself, a deviation between the imaging timing and the count value is eliminated. However, since an encoder value from the servo motor cannot be distributed to both the controller 100 and the image sensor 124, the encoder value is not output to the controller 100 if the encoder value is output to the image sensor 124. The information processing system 1 according to this embodiment can eliminate the deviation between the imaging timing and the reference count value without distributing the encoder value from the servo motor to both the controller 100 and the image sensor 124.

The embodiments disclosed herein should be considered illustrative not limiting of the present invention in all respects. The scope of the present invention is defined by the claims rather than by the above description, and is intended to include all modifications within the meaning and scope equivalent to the claims.

What is claimed is:

1. An information processing system for identifying a current position of a workpiece that is conveyed on a conveyor, the information processing system comprising:
    a controller configured to receive a setting of an imaging timing, wherein the setting of the imaging timing is a setting of at least one of an exposure start time and an exposure end time of the image sensor, or a setting of an imaging interval of the workpiece in the image sensor;
    an image sensor for imaging the workpiece that is conveyed on the conveyor and measuring a position of the workpiece within an obtained image on the basis of arrival of the imaging timing received from the controller, and transmitting the position of the workpiece within the image to the controller; and
    a movement amount measurement device comprising a hardware encoder for communicating with the controller,
    wherein the movement amount measurement device
        measures a movement amount of the conveyor a plurality of times at intervals shorter than a cycle of communication with the controller, and
        transmits the plurality of measured movement amounts and the measurement timings of the plurality of respective movement amounts to the controller as a result of the measurement on the basis of arrival of a timing of transmission to the controller, and
    the controller is configured to:
    identify one or more measurement timings relatively close to the imaging timing from a plurality of measurement timings defined in the measurement result, and identify a movement amount associated with the measurement timing as a reference movement amount;
    identify a position of the workpiece at the imaging timing as a reference position on the basis of the position of the workpiece within the image received from the image sensor; and
    calculate the movement amount of the workpiece according to an elapsed time from the imaging timing on the basis of a current movement amount of the conveyor received from the movement amount measurement device and the reference movement amount, and add the movement amount to the reference position to calculate the current position of the workpiece.

2. The information processing system according to claim 1,
    wherein the controller adds a difference between the current movement amount of the conveyor received from the movement amount measurement device and the reference movement amount to the reference position to calculate the current position of the workpiece.

3. The information processing system according to claim 2,
    wherein the controller further outputs an operation instruction to a robot that picks up the workpiece using the current position of the workpiece.

4. The information processing system according to claim 1,
    wherein the controller identifies the measurement timing closest to the imaging timing from among the plurality of measurement timings defined in the measurement result received from the movement amount measurement device, and identifies the movement amount associated with the measurement timing as the reference movement amount.

5. The information processing system according to claim 1,
wherein the controller identifies a first measurement timing closest to the imaging timing and a second measurement timing second closest to the imaging timing from among the plurality of measurement timings defined in the measurement result received from the movement amount measurement device, and
identifies the reference movement amount to be between a movement amount associated with the first measurement timing and a movement amount associated with the second measurement timing.

6. The information processing system according to claim 5,
wherein the controller identifies the reference movement amount to be closer to the movement amount associated with the first measurement timing than to the movement amount associated with the second measurement timing.

7. The information processing system according to claim 1,
wherein the movement amount measurement device includes:
the hardware encoder for generating a pulse signal according to the movement amount of the conveyor; and
a counter for counting the number of pulses included in the pulse signal as the movement amount.

8. The information processing system according to claim 1,
wherein the movement amount measurement device includes:
a motor for driving the conveyor; and
the hardware encoder for measuring a driving amount of the motor as the movement amount.

9. The information processing system according to claim 1,
wherein the controller further includes an operation interface for receiving a setting of a measurement interval of the movement amount in the movement amount measurement device.

10. The information processing system according to claim 1,
wherein the image sensor includes a first timer for measuring arrival of the imaging timing received from the controller,
the movement amount measurement device includes a second timer for measuring a measurement timing of the movement amount, and
the first timer and the second timer are synchronized with each other.

11. The information processing system according to claim 1,
wherein the image sensor performs a sequential imaging process at the set imaging intervals.

12. An information processing device for identifying a current position of a workpiece that is conveyed on a conveyor, the information processing device comprising:
a communication interface for communicating with a movement amount measurement device comprising a hardware encoder to measure a movement amount of the workpiece that is conveyed on the conveyor, the communication interface receiving the movement amount measured a plurality of times at intervals shorter than a cycle of the communication with the movement amount measurement device, and measurement timings of the plurality of respective movement amounts as a result of the measurement from the movement amount measurement device;
an operation interface for receiving a setting of imaging timing for an image sensor that images the workpiece that is conveyed on the conveyor;
a sensor interface for acquiring, from the image sensor, a position of the workpiece measured from an image obtained by imaging the workpiece that is conveyed on the conveyor at the imaging timing;
a control circuit configured to:
identify one or more measurement timings relatively close to the imaging timing from among a plurality of measurement timings defined in the measurement result, and identify a movement amount associated with the measurement timing as a reference movement amount;
identify a position of the workpiece at the imaging timing as a reference position on the basis of the position of the workpiece within the image; and
calculate the movement amount of the workpiece according to an elapsed time from the imaging timing on the basis of a current movement amount of the conveyor received from the movement amount measurement device and the reference movement amount, and add the movement amount to the reference position to calculate the current position of the workpiece.

13. A position identifying method of identifying a current position of a workpiece that is conveyed on a conveyor, the position identifying method comprising:
a step of communicating, by a controller, with a movement amount measurement device that sequentially measures a movement amount of the workpiece that is conveyed on the conveyor, the communicating step including a step of receiving the movement amount measured a plurality of times at intervals shorter than a cycle of the communication with the movement amount measurement device, and measurement timings of the plurality of respective movement amounts as a result of the measurement from the movement amount measurement device;
a step of receiving, by the controller, a setting of imaging timing for an image sensor that images the workpiece that is conveyed on the conveyor;
a step of acquiring, from the image sensor, by the controller, a position of the workpiece measured from an image obtained by imaging the workpiece that is conveyed on the conveyor at the imaging timing;
a step of identifying, by the controller, one or more measurement timings relatively close to the imaging timing from among a plurality of measurement timings defined in the measurement result, and identifying a movement amount associated with the measurement timing as a reference movement amount;
a step of identifying, by the controller, a position of the workpiece at the imaging timing as a reference position on the basis of the position of the workpiece within the image; and
a step of calculating, by the controller, the movement amount of the workpiece according to an elapsed time from the imaging timing on the basis of a current movement amount of the conveyor received from the movement amount measurement device and the reference movement amount, and adding the movement amount to the reference position to calculate the current position of the workpiece.

14. A non-transitory recording medium, recording a position identifying program for identifying a current position of a workpiece that is conveyed on a conveyor, the position identifying program causing an information processing device to execute:

a step of communicating with a movement amount measurement device that sequentially measures a movement amount of the workpiece that is conveyed on the conveyor, the communicating step including a step of receiving the movement amount measured a plurality of times at intervals shorter than a cycle of the communication with the movement amount measurement device, and measurement timings of the plurality of respective movement amounts as a result of the measurement from the movement amount measurement device;

a step of receiving a setting of imaging timing for an image sensor that images the workpiece that is conveyed on the conveyor;

a step of acquiring, from the image sensor, a position of the workpiece measured from an image obtained by imaging the workpiece that is conveyed on the conveyor at the imaging timing;

a step of identifying one or more measurement timings relatively close to the imaging timing from among a plurality of measurement timings defined in the measurement result, and identifying a movement amount associated with the measurement timing as a reference movement amount;

a step of identifying a position of the workpiece at the imaging timing as a reference position on the basis of the position of the workpiece within the image; and a step of calculating the movement amount of the workpiece according to an elapsed time from the imaging timing on the basis of a current movement amount of the conveyor received from the movement amount measurement device and the reference movement amount, and adding the movement amount to the reference position to calculate the current position of the workpiece.

* * * * *